United States Patent
Liu et al.

(10) Patent No.: US 10,096,154 B2
(45) Date of Patent: Oct. 9, 2018

(54) LOCALIZED CONTOUR TREE METHOD FOR DERIVING GEOMETRIC AND TOPOLOGICAL PROPERTIES OF COMPLEX SURFACE DEPRESSIONS BASED ON HIGH RESOLUTION TOPOGRAPHICAL DATA

(71) Applicant: University of Cincinnati, Cincinnati, OH (US)

(72) Inventors: Hongxing Liu, Cincinnati, OH (US); Qiusheng Wu, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 18 days.

(21) Appl. No.: 15/478,506

(22) Filed: Apr. 4, 2017

(65) Prior Publication Data
US 2017/0365094 A1    Dec. 21, 2017

Related U.S. Application Data

(60) Provisional application No. 62/317,824, filed on Apr. 4, 2016.

(51) Int. Cl.

| | |
|---|---|
| *G06T 17/05* | (2011.01) |
| *G06K 9/00* | (2006.01) |
| *G06K 9/46* | (2006.01) |
| *G01S 13/90* | (2006.01) |
| *G06T 7/62* | (2017.01) |

(52) U.S. Cl.
CPC .......... *G06T 17/05* (2013.01); *G01S 13/9035* (2013.01); *G06K 9/00476* (2013.01); *G06K 9/4604* (2013.01); *G06T 7/62* (2017.01); *G06T 2207/10032* (2013.01)

(58) Field of Classification Search
None
See application file for complete search history.

(56) References Cited

U.S. PATENT DOCUMENTS

| | | | | |
|---|---|---|---|---|
| 7,899,272 | B1 * | 3/2011 | Hsu | G06K 9/0063 382/284 |
| 2012/0257792 | A1 * | 10/2012 | Simon | G01C 11/06 382/103 |

OTHER PUBLICATIONS

Barnes et al. (2014) Priority-flood: An optimal depression-filling and watershed-labeling algorithm for digital elevation models. Computers & Geosciences, 62(0), 117-127 et al. (2014).
Boyell and Ruston Hybrid techniques for real-time radar simulation. ed. Proceedings of the Nov. 12-14, 1963, fall joint computer conference, 1963, 445-458.

(Continued)

*Primary Examiner* — Yu Chen
(74) *Attorney, Agent, or Firm* — Dinsmore & Shohl LLP

(57) ABSTRACT

Computer-implemented methods for detecting and characterizing surface depressions in a topographical landscape based on processing of high resolution digital elevation model data according to a local tree contour algorithm applied to an elevation contour representation of the landscape, and characterizing the detected surface depressions according to morphometric threshold values derived from data relevant to surface depressions of the topographical area. Non-transitory computer readable media comprising computer-executable instructions for carrying out the methods are also provided.

18 Claims, 29 Drawing Sheets

(56) References Cited

OTHER PUBLICATIONS

Chu et al. 2013. Dynamic puddle delineation and modeling of puddle-to-puddle filling-spilling-merging-splitting overland flow processes. Water Resources Research, 49(6), 3825-3829.
Finkl, et al. "Interpretation of seabed geomorphology based on spatial analysis of high-density airborne laser pathymetry" Journal of Coastal Research, (2005) 21(3), 501-514.
Hayashi, M. et al. "Simple equations to represent the volume—area—depth relations of shallow wetlands in small topographic depressions" Journal of Hydrology, 237(1), 74-85 (2003).
Huang et al, "Differentiating tower Karst (fenglin) and cockpit karst (fengcong) using DEM contour, slope, and centroid," Environmental Earth Sciences, 72(2), 407-416 (2014).
Kweon and Kanade,1994. Extracting topographic terrain features from elevation maps. CVGIP: image understanding, 59(2), 171-182.
Li et al. (2011) Lidar DEM error analyses and topographic depression identification in a hummocky landscape in the prairie region of Canada. Geomorphology, 129(3-4), 263-275.
Lindsay and Creed ( (2005) "Removal of artifact depressions from digital elevation models: Towards a minimum impact approach" Hydrological Processes, 19(16), 3113-3126.
Liu et al. (2010) "An object-based conceptual framework and computational method for representing and analyzing coastal morphological changes" International Journal of Geographical Information Science, 24(7), 1015-1041.
Liu and Wang, 2008 ("Mapping detention basins and deriving their spatial attributes from airborne LiDAR data for hydrological applications" Hydrological Processes, 22(13), 2358-2369.
Martz and Garbrecht (1999) "An outlet breaching algorithm for the treatment of closed depressions in a raster DEM" Computers & Geosciences, 25(7), 835-844.

Ussyschkin, V. et al. "Airborne Lidar: Advances in Discrete Return Technology for 3D Vegetation Mapping." (2010) Remote Sensing, 3(3), 416-434.
Wang and Liu, "An efficient method for identifying and filling surface depressions in digital elevation models for hydrologic analysis and modelling" International Journal of Geographical Information Science, 20(2), 193-213 (2006).
White, S. A. et al. "Utilizing DEMs derived from LIDAR data to analyze morphologic change in the North Carolina coastline" Remote sensing of environment, (2003) 85(1), 39-47.
Qiusheng Wu et al, "A Localized contour tree method for deriving geometric and topological properties of complex surface depressions based on high-resolution topographical data"; International Journal of Geographical Information Science, 2015, vol. 29, No. 12, 2041-2060.
Qiusheng Wu et al, "Automated delineation of karst sinkholes from LiDAR-derived digital elevation models"; Geomorphology 266 (2016) 1-10.
Qiusheng Wu et al, "A Graph-Based Approach for assessing storm-induced coastal changes"; International Journal of Remote Sensing, 2016, vol. 37, No. 20, 4854-4873.
Bin Wu et al, "Individual tree crown delineation using localized contour tree method and airborne LiDAR data in coniferous forests"; International Journal of Applied Earth Observation and Geoinformation 52 (2016) 82-94.
Qiusheng Wu and Charles R. Lane, "Delineation and Quantification of Wetland Depressions in the Prairie Pothole Region of North Dakota"; Wetlands (2016) 36:215-227.
Bin Wu et al, "A Graph-Based Approach for 3D Building Model Reconstruction from Airborne LiDAR Point Clouds"; Remote Sensing 9.1 (2017) 92.
Qiusheng Wu et al, "An effective Method for Detecting Potential Woodland Vernal Pools Using High-Resolution LiDAR Data and Aerial Imagery"; Remote Sens. 2014, 6, 11444-11467.

* cited by examiner

Fig. 3A
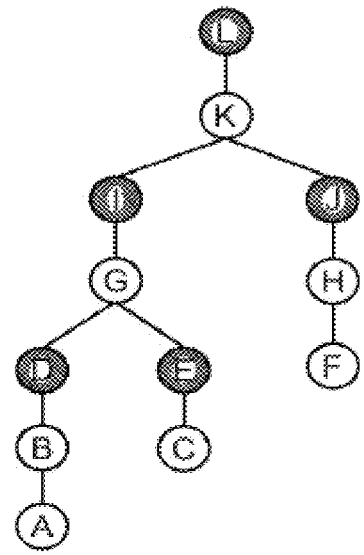
Fig. 3B
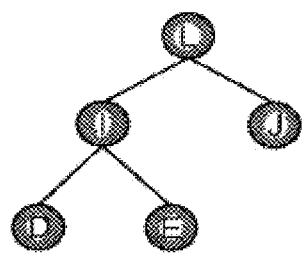
Fig. 3C
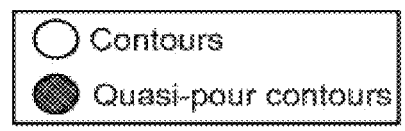
○ Contours
● Quasi-pour contours Table 4

| Statistics | Width (m) | Length (m) | Area (m²) | Volume (m³) | Depth (m) | STD (m) | ELG | CI |
|---|---|---|---|---|---|---|---|---|
| Min | 7.4 | 12.8 | 101.0 | 15.6 | 0.17 | 0.05 | 1.01 | 0.06 |
| 5ᵗʰ percentile | 12.9 | 18.6 | 169.2 | 108.3 | 0.73 | 0.18 | 1.10 | 0.31 |
| Median | 27.1 | 40.7 | 751.0 | 800.4 | 3.37 | 0.84 | 1.44 | 0.66 |
| Mean | 30.8 | 49.2 | 1225.6 | 1271.5 | 3.48 | 0.87 | 1.60 | 0.64 |
| 95ᵗʰ percentile | 59.0 | 110.8 | 3696.0 | 3667.1 | 6.55 | 1.64 | 2.54 | 0.91 |
| Max | 236.1 | 381.7 | 30029.0 | 56128.5 | 13.13 | 3.72 | 11.20 | 0.97 |

Fig. 14

Table 5

| Rank | Statistics | Width (m) | Length (m) | Area (m²) | Volume (m³) | Depth (m) | STD (m) | ELG | CI |
|---|---|---|---|---|---|---|---|---|---|
| 1st rank (n = 5299) | Min | 7.48 | 12.26 | 100.07 | 17.02 | 0.34 | 0.18 | 1.00 | 0.30 |
| | 5th percentile | 10.86 | 16.27 | 126.64 | 54.91 | 0.75 | 0.20 | 1.10 | 0.37 |
| | Median | 22.88 | 35.54 | 543.31 | 419.77 | 1.98 | 0.53 | 1.51 | 0.67 |
| | Mean | 25.88 | 40.57 | 827.07 | 764.07 | 2.47 | 0.64 | 1.59 | 0.66 |
| | 95th percentile | 51.53 | 85.29 | 2,642.40 | 2,563.55 | 5.66 | 1.44 | 2.32 | 0.91 |
| | Max | 79.79 | 140.15 | 3,991.30 | 21,035.00 | 14.34 | 4.41 | 2.55 | 0.98 |
| 2nd rank (n = 208) | Min | 15.08 | 33.83 | 395.50 | 341.47 | 1.36 | 0.29 | 1.10 | 0.02 |
| | 5th percentile | 19.66 | 44.46 | 631.63 | 654.36 | 1.92 | 0.45 | 1.28 | 0.17 |
| | Median | 42.79 | 81.04 | 2,023.11 | 2,325.73 | 4.63 | 1.00 | 1.92 | 0.41 |
| | Mean | 50.07 | 100.94 | 3,292.56 | 4,524.89 | 4.61 | 1.01 | 2.07 | 0.41 |
| | 95th percentile | 96.32 | 206.30 | 8,610.03 | 8,562.34 | 7.08 | 1.62 | 3.08 | 0.63 |
| | Max | 284.77 | 739.73 | 75,092.06 | 279,754.47 | 11.39 | 2.87 | 4.68 | 0.81 |
| 3rd rank (n = 37) | Min | 36.94 | 71.90 | 1,783.63 | 2,410.65 | 2.10 | 0.40 | 1.20 | 0.02 |
| | 5th percentile | 40.26 | 86.59 | 2,168.55 | 2,797.63 | 2.94 | 0.49 | 1.27 | 0.11 |
| | Median | 87.51 | 159.54 | 6,827.78 | 7,757.91 | 5.52 | 0.98 | 1.85 | 0.30 |
| | Mean | 106.07 | 195.36 | 10,371.91 | 11,410.61 | 5.34 | 1.01 | 1.95 | 0.29 |
| | 95th percentile | 238.44 | 380.52 | 24,887.89 | 32,097.61 | 7.78 | 1.61 | 2.88 | 0.43 |
| | Max | 330.37 | 672.76 | 47,538.59 | 68,436.05 | 8.63 | 1.77 | 3.04 | 0.51 |
| 4th rank (n = 10) | Min | 58.32 | 115.39 | 5,191.55 | 5,909.16 | 3.29 | 0.56 | 1.32 | 0.12 |
| | 5th percentile | 67.31 | 134.64 | 5,350.94 | 6,428.07 | 3.38 | 0.64 | 1.36 | 0.12 |
| | Median | 125.38 | 234.68 | 12,933.67 | 12,973.62 | 5.69 | 1.04 | 1.49 | 0.27 |
| | Mean | 134.58 | 222.00 | 12,915.62 | 16,216.36 | 5.81 | 1.07 | 1.76 | 0.25 |
| | 95th percentile | 199.79 | 279.65 | 22,518.36 | 33,052.69 | 7.78 | 1.60 | 2.68 | 0.33 |
| | Max | 210.59 | 280.28 | 25,995.62 | 39,412.51 | 8.18 | 1.75 | 2.71 | 0.34 |

Fig. 15

Table 6

| Land Cover Types | Area (km²) | Percent | KFDB | KFDB detected | KFDB detected% | KFDB not detected | Contour tree | New Sinkholes |
|---|---|---|---|---|---|---|---|---|
| Open Water | 4.6 | 0.2% | 0 | 0 | NA | 0 | 0 | 0 |
| Developed, Open Space | 75.0 | 3.4% | 273 | 95 | 34.8% | 178 | 318 | 223 |
| Developed, Low Intensity | 39.9 | 1.8% | 99 | 27 | 27.3% | 72 | 187 | 160 |
| Developed, Medium Intensity | 4.3 | 0.2% | 14 | 0 | 0.0% | 14 | 16 | 16 |
| Developed, High Intensity | 1.1 | 0.0% | 3 | 0 | 0.0% | 3 | 6 | 6 |
| Barren Land | 0.7 | 0.0% | 10 | 1 | 10.0% | 9 | 5 | 4 |
| Deciduous Forest | 416.4 | 18.6% | 414 | 116 | 28.0% | 298 | 1007 | 891 |
| Evergreen Forest | 9.0 | 0.4% | 3 | 1 | 33.3% | 2 | 3 | 2 |
| Mixed Forest | 0.5 | 0.0% | 0 | 0 | NA | 0 | 1 | 1 |
| Shrub/Scrub | 0.2 | 0.0% | 0 | 0 | NA | 0 | 1 | 1 |
| Grassland/Herbaceous | 256.2 | 11.5% | 1651 | 602 | 36.5% | 1049 | 1336 | 734 |
| Pasture/Hay | 487.9 | 21.8% | 849 | 250 | 29.4% | 599 | 1125 | 875 |
| Cultivated Crops | 926.2 | 41.5% | 2815 | 764 | 27.1% | 2051 | 1259 | 495 |
| Woody Wetlands | 7.7 | 0.3% | 6 | 2 | 33.3% | 4 | 26 | 24 |
| Emergent Herbaceous Wetlands | 3.4 | 0.2% | 2 | 0 | 0.0% | 2 | 9 | 9 |
| Total | 2232.9 | 100.0% | 6139 | 1858 | 30.3% | 4281 | 5299 | 3441 |

Fig. 16

Table 7

| Land-cover Type | Area (Km²) | Percentage |
|---|---|---|
| Open water | 47.8 | 9.4% |
| Developed, open space | 15.8 | 3.1% |
| Deciduous forest | 1.3 | 0.2% |
| Herbaceous | 181.9 | 35.9% |
| Hay/Pasture | 51.5 | 10.2% |
| Cultivated crops | 178.1 | 35.1% |
| Woody wetlands | 0.7 | 0.1% |
| Emergent Herbaceous wetlands | 29.6 | 5.9% |
| Total | 506.6 | 100.0% |

(Data source: National Land Cover Database 2011)

Fig. 23A

Table 8

| Data Set | Acquisition dates | Resolution | Application |
|---|---|---|---|
| LiDAR DEM | 10/27/2011-11/3/2011 | 1 m | deriving depressions |
| LiDAR intensity | 10/27/2011-11/3/2011 | 1 m | deriving waterbodies |
| Aerial photographs | 7/14/2012-7/30/2012 | 1 m | validating depressions |
| National wetlands inventory | 1979-1984 | 1:24K (~12.5 m) | comparing results |

Fig. 23B

Table 9

| Wetland type | Count | Min (m²) | Max (m²) | Median (m²) | Sum (m²) | Percentage |
|---|---|---|---|---|---|---|
| Freshwater emergent wetland | 7,804 | 247 | 1,702,709 | 1,634 | 52,379,106 | 84.0% |
| Freshwater forested/shrub wetland | 17 | 1,129 | 8,559 | 2,326 | 57,037 | 0.1% |
| Freshwater Pond | 225 | 398 | 113,803 | 1,663 | 1,649,852 | 2.6% |
| Lake | 23 | 113,342 | 2,099,961 | 200,678 | 8,193,801 | 13.1% |
| Riverine | 22 | 1,153 | 18,579 | 2,684 | 96,327 | 0.2% |
| Total (all polygons) | 8,091 | 247 | 2,099,961 | 1,635 | 62,376,123 | 100.0% |

LOCALIZED CONTOUR TREE METHOD FOR DERIVING GEOMETRIC AND TOPOLOGICAL PROPERTIES OF COMPLEX SURFACE DEPRESSIONS BASED ON HIGH RESOLUTION TOPOGRAPHICAL DATA

PRIORITY CLAIM

This application claims priority to U.S. Provisional Ser. No. 62/317,824 filed Apr. 4, 2016, the entire disclosure of which is incorporated herein by this reference.

BACKGROUND

A depression is a sunken area on Earth's surface surrounded by higher ground in all directions. Surface depressions are bowl-like landforms across a range of spatial scales. They are formed by either natural or anthropogenic processes. Natural surface depressions are abundant in topographically complex landscapes, particularly in glaciated, Karst, volcanic or Aeolian landscapes (e.g. Huang, et al. "Differentiating tower karst (fenglin) and cockpit karst (fengcong) using DEM contour, slope, and centroid," *Environmental Earth Sciences*, 72(2), 407-416 (2014), the entire disclosure of which is incorporated herein by this reference).

Examples of natural depressions include glaciated kettle lakes, cirques, prairie potholes, Karst sinkholes, volcanic craters, pit craters, impact craters, etc. Some surface depressions are related to a variety of human activities, such as, constructing detention basins and reservoirs, mining, quarrying, charcoal or lime production, or bombing.

Surface depressions trap, collect and often hold overland runoff from higher areas of their closed interior drainage basins during rainfall events and snowmelt in the spring. Therefore, they are often covered by water temporarily, seasonally or permanently, forming ponds, lakes, or wetland landscapes. Depressions trap and store sediment and nutrients, enhance water loss to the atmosphere via evaporation and to deep groundwater via infiltration, and provide critical habitats for plants and animals, having profound impacts on local or regional hydrologic, ecologic, and biogeochemical processes. The existence and density of surface depressions control hydrological partitioning of rainfall into infiltration and runoff and hydrologic connectivity, influence soil moisture states and vegetation patterns, regulate runoff water quality through trapping and filtering pollutants, wastes, sediments and excess nutrients, and create the wet and nutrient-rich environmental conditions for many species to exist and reproduce. The vital hydrologic and ecologic effects of surface depressions are largely determined by their geographical location, surface area, depth, storage volume, geometric shape, and other properties. Some of these properties are changing over time due to sedimentation, erosion, vegetation dynamics, and other processes. Detection, delineation and quantitative characterization of surface depressions with accurate and up-to-date information are critical to many scientific studies and practical applications, such as ecohydrologic modeling, limnological analyses, and wetland conservation and management.

However, most previous studies were based on coarse resolution topographical data, in which surface depressions are treated as nuisance or spurious features. This is because coarse resolution topographic data are unable to reliably resolve small surface depressions and the noise and error in the topographic data tend to create artifact depressions, which are difficult to distinguish from real surface depression features. In a standard hydrological analysis, surface depressions are identified and then simply removed to create a depressionless surface topography, which ensures that water flows continuously across the topographic surface to the watershed outlets and that the derived stream networks are fully connected for runoff routing. Depressions are typically removed by raising the elevations in depressions with a depression-filling algorithm, or less commonly by lowering the elevations of the depression boundary with a depression-breaching algorithm. In the previous studies, little attention has been paid to the geometric and topological properties of surface depressions themselves, and the effects of surface depressions on local and regional hydrology and ecology were largely ignored.

In recent decades, the advent of airborne light detection and ranging (LiDAR) and interferometric synthetic aperture radar (InSAR) remote sensing technologies have produced large volumes of highly accurate and densely sampled topographical measurements (1-5 m spatial resolution) (see White, S. A. et al. "Utilizing DEMs derived from LIDAR data to analyze morphologic change in the North Carolina coastline" *Remote sensing of environment*, (2003) 85(1), 39-47, and Finkl, et al. "Interpretation of seabed geomorphology based on spatial analysis of high-density airborne laser bathymetry" *Journal of Coastal Research*, (2005) 21(3), 501-514, the entire disclosures of which are incorporated herein by this reference). The increasing availability of high-resolution topographical data allows for an entirely new level of detailed delineation and analyses of small-scale geomorphologic features and landscape structures at fine scales (Ussyschkin, V. et al. "Airborne Lidar: Advances in Discrete Return Technology for 3D Vegetation Mapping." (2010) *Remote Sensing*, 3(3), 416-434, the entire disclosure of which is incorporated herein by this reference).

To fully exploit high resolution topographical data for scientific investigation of hydrologic and ecologic effects of surface depressions, new algorithms and methods are required to efficiently delineate, identify, and quantify surface depressions across scales.

SUMMARY

Accordingly, embodiments of the present invention provide a novel model for detecting and delineating surface depressions across scales and for characterizing their geometric properties and topological relationships based on deriving a localized contour tree. The methods are based on the novel concept of a pour contour. The numerical algorithm for surface depression identification is analogous to human visual interpretation of topographical contour maps.

One embodiment of the invention is directed to computer-implemented methods for detecting and characterizing surface depressions in a topographical area. The methods comprise a) providing a digital elevation model (DEM) of the topographical area; b) designating a base elevation contour and a contour interval for the DEM; c) using the base elevation contour and interval from b), generating an elevation contour representation of the topographical area, wherein the contour representation comprises closed contour lines and excludes open contour lines; d) identifying one or more seed contours, defined as a lowest elevation interior contour in a set of concentric closed contours, and, beginning with the lowest elevation seed contour and hierarchically expanding to higher elevation contours until a highest elevation contour is reached, constructing a local contour tree, wherein each contour line is represented as a node in the local contour tree; and e) repeating step (d) iteratively until all highest elevation contours are incorporated in a local contour tree; wherein the number of surface depressions corresponds to the number of local contour trees, a simple depression comprises a local contour tree with one seed node, and a complex depression comprises a local contour tree with more than one seed node. A quasi-pour contour node is the highest elevation contour line for each local contour tree; however the true pour contour node may be calculated. The true pour contour node is the spill elevation and the quasi-pour contour node must be less than or equal to the elevation of the true pour contour node.

Contour trees are constructed from the contour line representations wherein a line is equivalent to a node such that a local contour tree comprises one root node corresponding to a highest elevation contour, a set≥0 of internal nodes, and a set≥1 of terminal nodes, each terminal node corresponding to a seed contour enclosed within the highest elevation contour, each internal node having 0 or 1 parent nodes, and 1 or more child nodes, wherein an internal node having 2 or more child nodes is designated a fork node, and each child of a fork node is designated a split node.

In some embodiments, the identified surface depressions may be further characterized by calculating one or more morphometric properties of the depression relevant to the type of depression sought to be identified.

Other embodiments of the invention provide non-transitory computer readable media comprising computer-executable instructions for carrying out one or more embodiments of the inventive methods.

One embodiment provides a method for detecting and characterizing surface depressions in a topographical landscape, the method comprising: detecting surface depressions by generating a forest of local contour trees from a contour representation of the landscape, said contour representation generated according to a base elevation and a contour interval, each local contour tree corresponding to a surface depression and comprising a pour contour node, and at least one sink point; and characterizing the surface depressions by filtering the detected surface depressions according to a plurality of morphological thresholds, said morphological thresholds being derived from data relevant to surface depressions of the topographical area.

Topological relationships between adjacent contour lines are established and one or more local contour trees are derived based on graph theory. By using a localized fast priority search algorithm over the contour tree, the pour contours are identified to represent surface depressions at different scales (levels). Surface area, storage volume and other morphological/morphometric properties may be calculated for each individual depression, and the nested topological relationships between surface depressions may be derived, providing critical information for characterizing hydrologic connectivity, simulating the dynamic filling-spilling-merging hydrologic process, and examining the ecologic and biogeochemical function of surface depressions on both natural and human-modified landscapes.

These and other embodiments and aspects will be clarified and expanded by reference to the Figures and Detailed description set forth below. Figures are included to illustrate certain concepts and particular embodiments and should not be construed as limiting the full scope of the invention as defined by the appended claims.

BRIEF DESCRIPTION OF THE FIGURES

FIG. 3A. Illustration of single-branch local contour tree representation for the simple surface depression of FIG. 1;

FIG. 3B. Illustration of a multi-branch contour tree for the composite/compound surface depression shown in FIG. 2; and FIG. 3C. A simplified contour tree for the composite surface depression of FIG. 2.

FIG. 14. Table 4 setting forth summary statistics for the 1784 $1^{st}$ rank training sinkholes.

FIG. 15. Table 5 setting forth summary statistics for the extracted sinkholes of four different ranks.

FIG. 16, Table 6 providing a comparison of the sinkhole inventory database and the LiDNR-derived sinkhole data (note: KFDB=sinkhole inventory points in Karst Feature Database; KFDB detected=sinkhole inventory points located within LiDAR-derived depressions using the contour tree method; KFDB not detected=sinkhole inventory points not located within LiDAR-derived depressions; and new sinkholes=sinkholes detected using the contour tree method but not recorded in KFDB).

FIG. 224. A false color composite of 1-m resolution infrared aerial photograph for the Little Pipestem Creek watershed from 2012.

FIG. 23A. Table 7 sets forth land-use and land-cover composition for the Little Pipestem Creek watershed study area;

FIG. 23B. Table 8 showing a summary of data sets acquired, data acquisition dates, data resolution, and use; and FIG. 23C. Table 9 shoving a summary of the statistics for the NWI data for the study area.

FIG. 29. Exemplary computer-executable source code for implementing the method according to claim 1.

DETAILED DESCRIPTION

Surface depressions are abundant in topographically complex landscapes and they exert significant influences on hydrologic, ecological and biogeochemical processes at local and regional scales. The recent emergence of LiDAR and InSAR remote sensing technologies provides an extraordinary capability for acquiring high resolution topographical data, which makes it possible to detect and quantify small surface depressions.

The localized contour tree method was developed by imitating human reasoning processes for interpreting and recognizing surface depressions from a vector-based contour map. A new concept of "pour contour" is set forth and applied to develop a graph theory-based contour tree representation that is provided for the first time to tackle the surface depression detection and delineation problem. The pour contour and the contour tree constitute the cornerstones concepts and the detection methods are conceptually different from the previous raster-based depression detection methods. The localized growing and construction of contour trees and development of optimal tree search algorithms ensure the computational feasibility and efficiency of the methods.

Surface topography can be digitally represented by raster-based elevation grids-Digital Elevation Models (DEMs) or by vector-based equal elevation contour lines. In a DEM, a surface depression consists of a local minimum and a set of spatially connected grid cells of low elevation, which are completely surrounded by embankment cells of higher elevation. The local minimum at the depression bottom is referred to as a sink point or a pit (FIGS. 1A and 1B), and its elevation is less than or equal to that of its eight neighbors. The sink point does not have a natural downslope flow path to watershed outlets, and the surrounding overland flow drains towards the sink point of the depression, forming an interior basin. When more runoff water drains to the depression, the water surface in it will eventually be raised to a certain level at which flood water starts to overflow from its perimeter. The lowest cell on the depression perimeter is referred to as the pour point, where water would pour out if the depression is filled up with water.

Figure 1A:
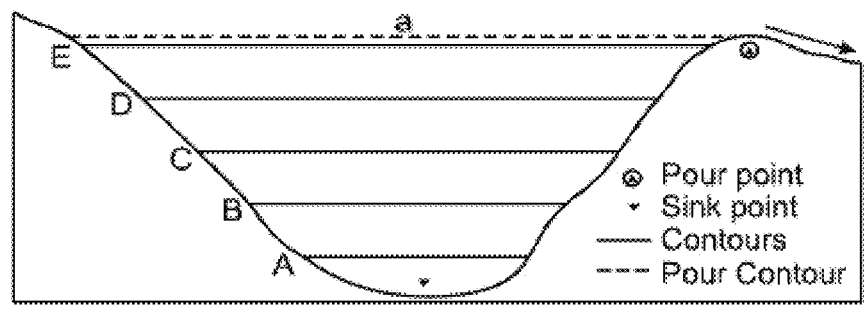
FIG. 1A. Longitudinal profile of an exemplary simple surface depression.
Figure 1B:
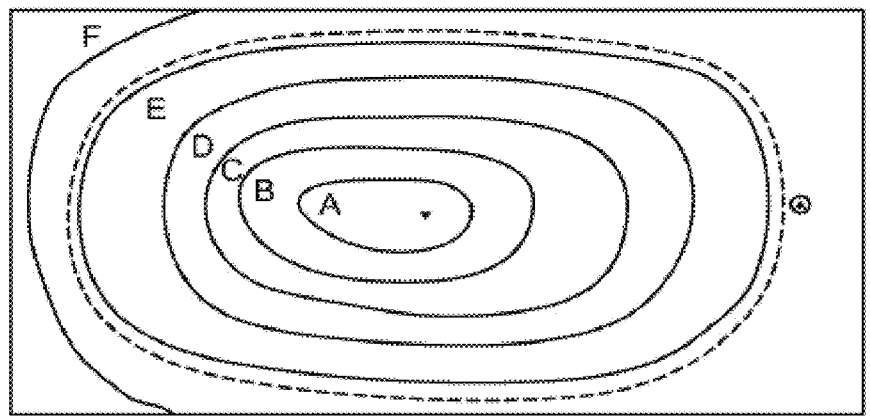
FIG. 1B. A contour representation of the simple surface depression.

Geometrically, the boundary of a surface depression is defined by the maximum level water surface, when flood water fills up the depression and starts to spill out (FIGS. 1A and 1B). The elevation of the depression pour point is referred to as spill elevation (see Wang and Liu, "An efficient method for identifying and filling surface depressions in digital elevation models for hydrologic analysis and modeling" *International Journal of Geographical Information Science,* 20(2), 193-213 (2006), the entire disclosure of which is incorporated herein by this reference). The boundary of a surface depression indicates the spatial extent of the pond/lake created by flooding the depression.

In a vector-based contour representation, a surface depression is indicated by a series of concentric (concentric, as utilized herein, is not intended to be interpreted literally, but to indicate that all lines in the series are closed, non-intersecting, and have a common interior sink point) closed contours with the inner contours having lower elevation than their outer surrounding (FIGS. 1A and 1B). Although a hill has a similar concentric pattern of closed contours, the elevation increases rather than decreases toward the inner contours. On a topographical map, small tick marks or hachures, special cartographic symbols, are applied to the closed contour lines of the depression, with hachures pointing downslope. Such contours are referred to as hachured contour lines or depression contour lines. The sink point is located inside the innermost closed contour line. The outermost closed contour line of the depression indicates the spatial extent (boundary) of the depression. The elevation of the outermost closed contour approximates the spill elevation.

Figure 2A:
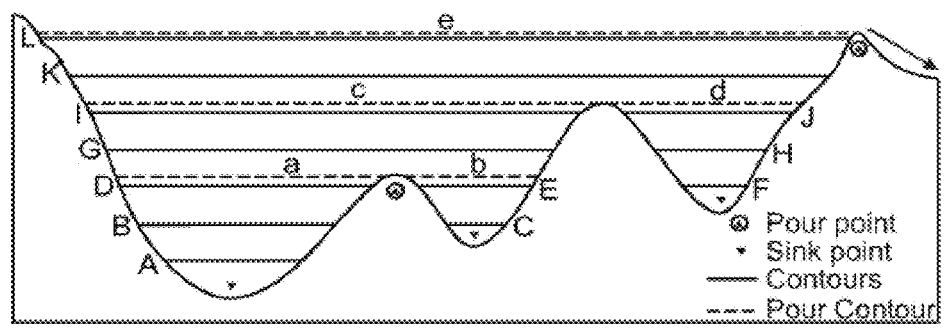
FIG. 2A. Longitudinal profile of an exemplary composite/compound surface depression with nested hierarchical structure.
Figure 2B:
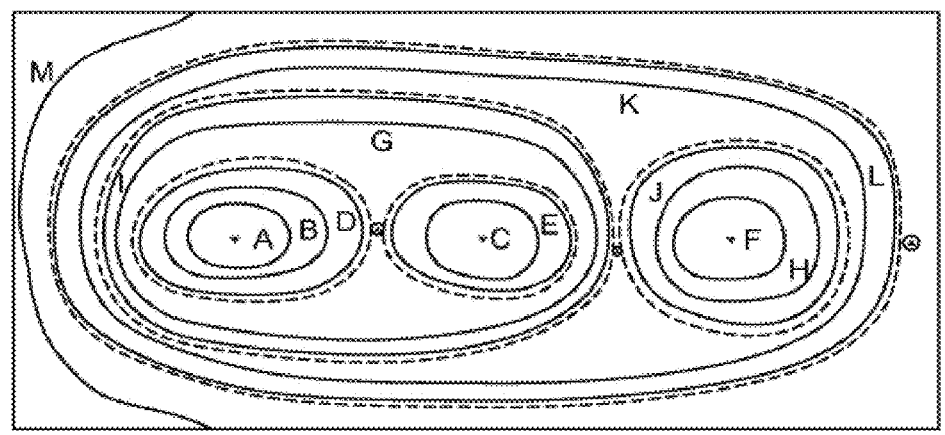
FIG. 2B. A contour representation of the compound surface depression.

Surface depressions may vary in size, depth, and shape. The composition and structure of surface depressions can be highly complex (see, e.g. Hayashi, M. et al. "Simple equations to represent the volume-area-depth relations of shallow wetlands in small topographic depressions" *Journal of Hydrology,* 237(1), 74-85 (2003), incorporated herein by reference). Some surface depressions might contain flat areas and other smaller nested depressions. On a topographical contour map, complex surface depressions are manifested by the nested relationships of several sets of concentric closed contours (FIGS. 2A and 2B). The nested hierarchical structure of surface depressions controls the dynamic filling-spilling-merging hydrologic process.

Surface depressions detected from a DEM or a contour map could be real landscape features or spurious artifacts. Artifact depressions are not actual bowl-like landforms. They are caused by topographical data noise and errors, such as original measurement errors, data truncation or rounding errors, interpolation defects during data processing, and the limited horizontal and vertical resolution of DEMs (see Martz and Garbrecht (1999) "An outlet breaching algorithm for the treatment of closed depressions in a raster DEM" Computers & Geosciences, 25(7), 835-844, incorporated herein by reference). Artifact depressions are very common in coarse resolution DEMs, particularly for low-relief terrains, id. Despite superior spatial resolution and high vertical accuracy, high resolution DEMs from LiDAR and InSAR technologies may also contain depression artifacts due to their imperfections (see Li et al. (2011) "Lidar DEM error analyses and topographic depression identification in a hummocky landscape in the prairie region of Canada. Geomorphology, 129(3-4), 263-275, incorporated herein by reference). Artifact depressions are often characterized by small size, shallowness, or irregular shapes.

A number of algorithms and methods have been proposed to detect and characterize surface depressions in the literature (Marks et al. 1984, Jenson and Domingue 1988, Planchon and Darboux 2002, Lindsay and Creed 2006, Wang and Liu 2006, Barnes et al. 2014). The most widely used conventional method for handling surface depressions was developed by Jenson and Domingue (1988). This conventional method is overly time-consuming and deficient for handling large high resolution DEM data sets. To process massive LiDAR DEMs for surface depression delineation, Wang and Liu (see "An efficient method for identifying and filling surface depressions in digital elevation models for hydrologic analysis and modeling" International Journal of Geographical Information Science, (2006) 20(2), 193-213, incorporated herein by reference) developed a very efficient algorithm to identify and fill surface depressions by introducing the concept of spill elevation and integrating the priority queue data structure into the least-cost search of spill paths. Due to its high computation efficiency and coding simplicity and compactness, the priority-flood algorithm of Wang and Liu ENREF 4 has been widely adopted and implemented by several open source GIS software packages, e.g., SAGA GIS (http://www.saga-gis.org/), and Whitebox Geospatial Analysis Tools (GAT) (http://www.uoguelph.ca/~hydrogeo/Whitebox/). A number of variants of the priority-flood algorithm with a varying time complexity have been proposed, and a detailed review is provided by Barnes et al. (2014) Priority-flood: An optimal depression-filling and watershed-labeling algorithm for digital elevation models. Computers & Geosciences, 62(0), 117-127 et al. (2014), incorporated herein by reference. To distinguish real surface depressions from artifacts, Lindsay and Creed ((2005) "Removal of artifact depressions from digital elevation models: Towards a minimum impact approach" Hydrological Processes, 19(16), 3113-3126, incorporated herein by reference) developed a stochastic depression analysis method. In their method, the Monte Carlo procedure is utilized to create a random error grid, which is then filled by using the priority-flood algorithm of Wang and Liu (2006). The probability of a depression occurring at any given location is calculated as the ratio of the number of depression occurrences to the total number of iterations. Those with a probability higher than a user-specified threshold value are identified as real surface depressions. The stochastic depression analysis algorithm of Lindsay and Creed (2006) has been implemented as a plugin tool in Whitebox GAT, a powerful open-source GIS and Remote Sensing software package developed at the University of Guelph's Centre for Hydrogeomatics.

Previous studies have focused on identifying and filling surface depressions based on raster-based DEMs for hydrologic modeling of overland flow (surface runoff). So far, little research has been directed to the quantitative characterization of surface depressions or the explicit representation and derivation of spatial relationships between surface depressions, although the newly emerged high resolution topographical data contains sufficient information to reliably resolve even small scale surface depression features. To fill up this research gap, the present inventors developed methods based on a novel localized contour tree algorithm.

In contrast to previous studies, embodiments of the method are based on the vector-based contour representation of surface topography. The computational algorithm of embodiments of the method is conceptually similar to the reasoning logic of human visual interpretation of surface depressions on a topographical map, namely, identifying surface depressions through finding sets of concentric closed contours with the decreasing elevation towards the inner center. It includes four key technical components: 1) Identifying the "seed contours" to construct local contour trees to represent the topological relationships between adjacent closed contours based on the graph theory; 2) identifying quasi "pour contours" to approximate surface depressions by fast breadth-first priority search over each local contour tree; 3) using an outer expansion algorithm to determine true "pour contours" to precisely delineate surface depressions and then compute their geometric and volumetric properties; and 4) simplifying local contour trees by removing non-pour contour nodes to derive explicit nested relationships between surface depressions across scales.

Identification of Seed Contours and Construction of Local Contour Trees

Contour lines can be derived from a DEM consisting of regularly distributed elevation points or from the Triangulated Irregular Networks (TIN) consists of irregularly distributed elevation points. The position and density of contour lines are determined by two important parameters: the base contour line and the contour interval. The data noise or errors in the DEM or TIN may lead to jagged, irregular or fragmented contour lines. The common practice to reduce data noise is to smooth the DEM by a filtering operation prior to generating contours. A Gaussian or median filter can be used to remove data noise and suppress small artifact depressions without distorting the boundaries of true topographical depressions (Liu et al. (2010) "An object-based conceptual framework and computational method for representing and analyzing coastal morphological changes" International Journal of Geographical Information Science, 24(7), 1015-1041, the disclosure of which is incorporated herein by reference). Contours are then created based on the smoothed DEM with an appropriate contour interval.

There are two types of contours: closed contours and open contours. An open contour has a starting and an ending points that intersect map edges at different locations (e.g., contour F in FIG. 1B), while a closed contour is continuous without intersections with the map edges, forming a loop (e.g., contour A, B, C, D, and E in FIG. 1B). To detect surface depressions, only closed contours with a concentric pattern are examined, while all open contours are ignored in the subsequent analysis. First, "seed contours" are identified and used to construct local contour trees. A seed contour is a closed contour that contains a sink point, but does not contain any other contours inside. The seed contour is the innermost closed contour, which may be surrounded by other contours. As shown in FIGS. 2A and 2B, contours A, C, and F are seed contours, whereas contours B, D, E, G, H, I, J, K and L are not. The local contour tree construction is prioritized in terms of the elevation value of the identified seed contours, and the seed contour with the lowest elevation value is first processed in the queue.

The contour tree is a conceptual data structure for describing the relationships among contours (see Kweon and Kanade, 1994. Extracting topographic terrain features from elevation maps. *CVGIP: image understanding*, 59(2), 171-182, incorporated heren by reference). A contour map can be transferred into a graph with a tree structure (Boyell and Ruston "Hybrid techniques for real-time radar simulation. ed. *Proceedings of the Nov.* 12-14, 1963, fall joint computer conference, 1963, 445-458). The present work utilizes the contour tree to represent the topological relationship between adjacent contours within a set of concentric closed contours. The tree is composed of a root node, a set of internal nodes (branches), and a set of terminal nodes (leaves). The nodes in the tree represent closed contours, and the link (edge) between nodes represents the containment relationship between two adjacent closed contours. Each node in a contour tree has only one parent node, but may have one or more child nodes. If an internal node has two or more child nodes, it is called fork (or join) node. The two or more child nodes of a fork node are called split nodes. The contour tree is constructed in a bottom-up manner with a tree growing algorithm. For a simple surface depression shown in FIGS. 1A and 1B, the contour tree is initiated with the seed contour A as the leaf (terminal) node, which is the first level contour at the bottom of the tree. Then, the contour tree is grown by searching and adding the adjacent closed contour B that contains the seed contour (leaf node) as its parent node. This iterative process continues, until the surrounding outermost closed contour E is included as the root node. The single level surface depression leads to a simple one-branch contour tree (FIG. 3A).

For a complex nested surface depression shown in FIGS. 2A and 2B, the bottom-up tree growing algorithm results in a multi-branch contour tree. The root node (L in FIG. 3B) has the highest elevation and directly or indirectly encloses all of the other closed contours. A, C and F are the leaf nodes (seed contours) without child nodes. The split and merge at an internal node indicate the change in topological relationship. The fork node G has two child nodes (contours) of the same elevation, D and E. The contour tree embodies the dynamic filling-spilling-merging hydrologic process of the nested hierarchical structure of depressions (see Chu et al. 2013. Dynamic puddle delineation and modeling of puddle-to-puddle filling-spilling-merging-splitting overland flow processes. *Water Resources Research*, 49(6), 3825-3829, incorporated herein by reference). When the overland runoff flows into the depression a and depression b (FIGS. 2A and 2B), its water surface would gradually increase from the leaf node level (seed contour) to the parent node level of higher elevation. When the water surfaces of depression a and depression b reach to their spill elevation SE1 (Wang and Liu 2006), these two adjacent depressions would merge to form a larger complex depression c, which is reflected by sibling nodes D and E join at fork node G in the contour tree (see FIG. 3B). When the water surface levels of depression c and depression d increase to above their spill elevation SE2, these two depressions further combine to form an even more complex and larger surface depression e, which corresponds to the merge of nodes I and J at node K. Clearly, the contour tree contains the information about the nested hierarchical relationships between surface depressions of different scales. Each local contour tree represents one disjointed depression (simple or composite), and the number of trees in the forest represent the total number of disjointed depressions (single or composite) for the entire area.

Identification of Quasi-Pour Contours Through a Priority Breadth-First Search Spanning Local Contour Trees In this study, a surface depression is treated as a 2D spatial object whose spatial extent is defined by the maximum level water surface area when flood water completely fills up the depression and starts to spill out from its pour point. The boundary of a surface depression corresponds to a closed contour with the same elevation as its pour point, which is referred to as the pour contour in this study. The pour point of the depression is located on its pour contour. Therefore, the task of surface depression detection becomes the identification of pour contours. For a simple one-branch contour tree in FIG. 3A, the root node E indicates the outermost closed contour of the single level depression, which is surrounded by either open contours or closed contours with a lower elevation. The closed contour corresponding the root node E is referred to as a quasi-pour contour. Due to the contour interval, the elevation value of the quasi-pour contour may be equal to or slightly smaller than the spill elevation, and the quasi-pour contour would be overlapped or contained by the true pour contour in a close vicinity (FIGS. 1A and 1B). For a multi-branch contour tree (FIG. 3B), the root node L is a quasi-pour contour too, which approximates the boundary of the highest level surface depression e (FIG. 2). The nodes I and J, two child split nodes of the fork node K, are two quasi-pour contours, approximately representing the boundaries of two surface depressions c and d (FIG. 2A). Similarly, the nodes D and E are the child nodes of the fork node G. They are quasi-pour contours, approximately defining the boundaries of surface depressions a and b (FIG. 2A).

In a contour tree, the root node and the child split nodes of all fork nodes are quasi-contours, which approximates all surface depressions across scales. A breadth-first priority search algorithm is applied to the contour tree to find and label all quasi-pour contours.

Determination of True Pour Contours and Geometric Properties of Surface Depressions The elevation value of a quasi-pour contour may be equal to or lower than the spill elevation. The elevation difference between a quasi-pour contour and the true pour contour is always smaller than the contour interval. When the contour interval is sufficiently small, all quasi contours would be very close to their true pour contour.

When a quasi-pour contour has a slightly smaller value than the spill elevation, the surface area and depth of the spatial object bounded by the quasi-pour contour would be accordingly smaller than those of the true pour contour. To get accurate measurements on the geometric properties of surface depressions, each quasi-pour contour is expanded outward within the contour interval to determine its true pour contour using an incremental buffering algorithm. The true pour contours are then used to define the boundaries of all surface depressions.

In specific examples, using the true pour contours as the boundaries, three sets of geometric properties for each surface depression are derived: 1) planimetric attributes, 2)

depth and volumetric attributes, and 3) shape attributes. Planimetric attributes include the geographical location of centroid point, perimeter, and surface area. Depth and volumetric attributes include mean depth, maximum depth, and storage volume of water detention capacity. Shape attributes include compact index, circularity, and asymmetry. The planimetric and shape attributes are calculated by treating the true pour contour as a polygon. The depth and volumetric attributes are calculated by statistical analysis of all elevation cells within the true pour polygon. The maximum depth of a surface depression is the elevation difference between pour point (spill elevation) and the sink point.

Derivation of Explicit Nested Topological Relationships of Surface Depressions Through Simplification of Local Contour Trees To explicitly represent the nested hierarchical structure of a complex surface depression, the local contour tree is simplified by removing the nodes that do not correspond to pour contours. The root node of the contour tree is kept in the simplification since it always represents a pour contour. By searching the contour tree top-down, we examine each node if it is a child split node of a fork node. Only the child split nodes of fork nodes are retained, and other nodes in the contour tree simplification are deleted.

After the simplification, the single branch contour tree only has the root node left (e.g., FIG. 3A). The multi-branch contour tree shown in FIG. 3B is reduced to a smaller compact tree with only 5 nodes (FIG. 3C). The simplified tree may be referred to as the depression tree, since all nodes are pour contours and represent surface depressions at different levels within a complex depression. The leaf nodes of the simplified depression tree represent simple depressions at the first level. The parent fork node of two leaf nodes in the depression tree represents a composite at the second level. The merge of a second level depression node with other second level depression nodes or with other first level depression nodes form a more complex third level depression. The complexity level of a composite depression can be measured by the height of the depression tree, namely the length of the longest path from the root node to the leaf nodes.

Traversing the depression tree top-down simulates the splitting of a large composite surface depression into smaller lower level depressions when water level decreases, while traversing the depression tree bottom-up emulates the merging of smaller lower level depressions into larger and more complex depressions when water level increases. A complex depression may have more than one first level simple depressions embedded within it. FIG. 2A illustrates a complex depression e with three-levels, in which three first level depressions (a, b, d) and one second level depression (c) are nested inside. The combination of the topological information about the nested hierarchical structure and the geometric attributes provides a comprehensive description and quantification of each individual surface depression across scales.

Computation Procedure and Algorithm Pseudo Code

Figure 4:
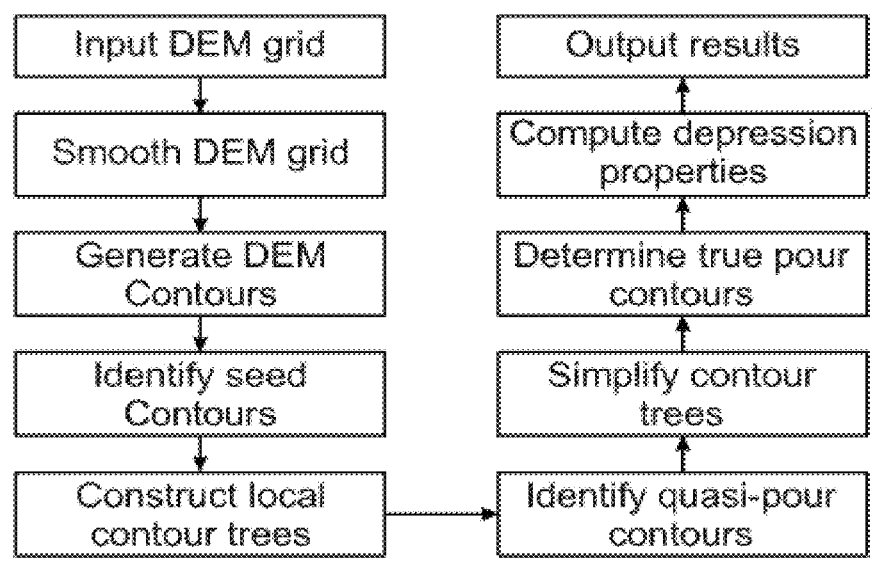
FIG. 4. Flowchart showing a general embodiment of a localized contour tree method.

Embodiments of the inventive methods are specifically designed for computer implementation to provide rapid construction/detection and delineation of surface depressions in a landscape of interest. The flowchart in FIG. 4 shows the data processing steps and algorithm components of one exemplary embodiment of a localized contour tree method. The data processing steps include: 1) Smooth the DEM with a Gaussian or median filter; 2) generate contours from the smoothed DEM by choosing the elevation of the base contour and the contour interval; 3) identify seed contours and construct local contour tree based on the topological relationship between the concentric closed contours; 4) search and identify all quasi-pour contours and simplify the local contour tree to the depression tree; 5) determine true pour contours and its spill elevation based on quasi-pour contour using an incremental expansion algorithm; and 6) calculate planimetric, volumetric and shape properties for each surface depression defined by the true pour contour.

Algorithm pseudo codes for key technical components are given in Table 1. Algorithms and mathematical equations used for computing planimetric, volumetric and shape properties can be found in Liu and Wang, 2008 ("Mapping detention basins and deriving their spatial attributes from airborne LiDAR data for hydrological applications" *Hydrological Processes,* 22(13), 2358-2369) and Liu et al. (2010), both of which are incorporated herein by this reference.

Figure 29:
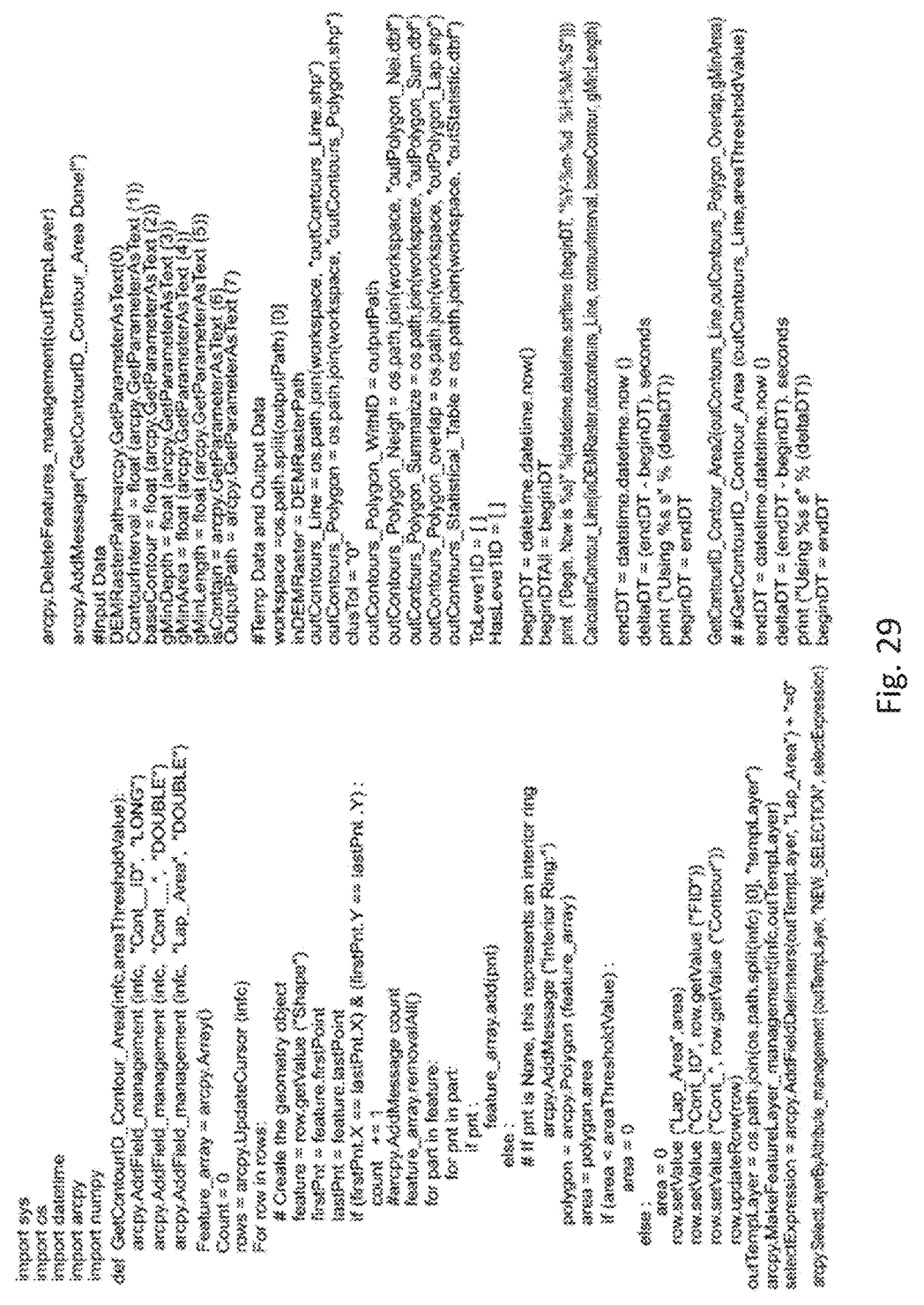

The algorithm has been implemented using Microsoft Visual C++.NET programming language and ArcObjects SDK for .NET. An array is declared as CONTOUR, which stores the information for each closed contour. The member variables of the array CONTOUR include the contour unique identification number (UIN), contour elevation (CE), sink point elevation (SPE), inwards adjacent contour neighbors (NBR), outwards adjacent contour unique identification number (OUIN), outwards adjacent contour elevation (OCE) and depression level (DL). If no outwards adjacent contour exists, the OUIN and OCE are set as −1. To derive the number of inwards adjacent neighbors (NBR) for each contour, we used the ArcGIS "Polygon Neighbors" geoprocessing tool. The contour line feature layer was first converted to non-overlapping polygon feature layer and then used as the input for the "Polygon Neighbors" tool, which finds the neighbors of each contour polygon and record the statistics in the output table. A priority queue is declared as SEED, which has the same member variables as CONTOUR. We prioritize the local contour tree construction in terms of the elevation value of the identified seed contours, and the seed contour with the lowest contour elevation (CE) has the top priority and is first processed in the queue. The member functions of the priority queue include SEED.push( ) SEED.top( ) and SEED.pop( ) which respectively support the operations of inserting a contour node into the queue, searching the lowest elevation contour node from the queue, and deleting the lowest elevation contour node from the queue. By looping through the array CONTOUR, the contours with no inwards adjacent contour neighbors (NBR=0) are determined as seed contours and inserted into the priority queue SEED through the member function SEED.push( ) Another two priority queues are declared as LBQ and UBQ, which store the contour nodes representing the lower and upper bound at each depression level, respectively. The array FLAG marks the contour nodes that have been processed and pushed into the queue. Two maps are declared as QPOUR and TPOUR, which store the set of quasi pour contours and true pour contours at each depression level, respectively. Maps are associative containers that store elements formed by key/value pairs and are accessible by key and by index. FIG. 29 illustrates a computer-implementable code for an exemplary method.

TABLE 1

(a) Pseudo-code for identifying all quasi-pour contours and assigning level number to each depression; (b) pseudo-code for determining true pour contours based on quasi contours with an incremental expansion algorithm.

| (a) | (b) |
|---|---|
| Function IdentifyQuasiPourContour | Function IdentifyTruePourContour |
|   LBQ ← SEED |   D = contour interval |
|   level ← 1 |   W = contour elevation difference |
|   condition ← true |   For level =1 to max(level) |
|   While condition |     LBQ ← QPOUR[level] |
|     While LBQ is not empty |     For each quasi pour contour (s) in |
|       s ← LBQ.top( ) |     LBQ |
|       LBQ.pop(s) |       low ← s.CE |
|       While s.OUIN ≠ −1 and s.CE < |       high ← s.CE + D |
|       s.OCE |       While (high − low < W) |
|         t ← CONTOUR[s.OUIN] |         mid ← (low + high) / 2 |
|         If t.NBR = 1 Then |         If contour(mid) is closed and |
|           s ← t |         only encloses contour(s) |
|         End If |         Then |
|       End While |           low ← mid |
|       UBQ.push(s) |         Else If contour(mid) is open |
|     End While |           high ← mid |
|     If UBQ.size > 0 Then |         End If |
|       QPOUR.add(level, UBQ) |       End While |
|       level ← level + 1 |       If contour(high) is closed |
|       While UBQ is not empty |       contour Then |
|         s ← UBQ.top( ) |         UBQ.push(high) |
|         UBQ.pop(s) |       Else If contour(mid) is closed |
|         If s.OUIN ≠ −1 and s.CE < |       contour Then |
|         s.OCE |         UBQ.push(mid) |
|           t ← CONTOUR[s.OUIN] |       Else If contour(low) is closed |
|           If t.NBR > 1 and FLAG[t] |       contour Then |
|           = false |         UBQ.push(low) |
|             LBQ.push(t) |       End If |
|             FLAG[t] ← true |     End For |
|     Else |     TPOUR.add(level, UBQ) |
|       condition ← false |   End For |
|     End If | End Function |
|   End While | |
| End Function | |

The inventive localized contour tree method is fundamentally different from the previous raster-based methods for surface depression detection. The rationale used in our method for surface depression detection is the same as the reasoning process that a human interpreter visually identifies surface depressions from a vector-based contour map. The design is based on a core concept "pour contour" that developed by the present investigators for surface depression studies. The graph theory based algorithms have been introduced to implement different technical components of the method. The surface depression detection problem is treated as the identification of a set of concentric contours with an increasing elevation outward, which is represented by a contour tree. The delineation of surface depressions is realized by identifying and refining pour contours. The search for surface depressions only occurs locally surrounding the seed contours rather than globally over all contours for the entire study area. The breath-first priority search is used to construct and grow local contour trees, identify quasi-pour contours, and simplify the contour tree. Localized contour tree construction and optimized graph theory based search algorithms make embodiments of the inventive methods computationally efficient and fast. The detection results for surface depression are reliable and consistent with human interpretation results.

According to embodiments of the method, each disjoined surface depression is detected and identified as one local contour tree. A disjointed surface depression is spatially independent of other surface depressions. When fully flooded, water in a disjointed surface depression will spill out and become overland flow, rather than directly merging with other surface depressions. A disjoined surface depression can be a single depression represented by a single-branch contour tree or a complex nested depression represented by a multi-branch contour tree. All disjointed surface depressions in the study area correspond to a forest of many local contour trees.

Embodiments of the method further explicitly derive the geometric and topological properties of surface depressions. This goes beyond the previous raster-based methods, which focused on surface depression detection and filling without much attention to quantification of surface depressions. By precisely determining the position of true pour contours as the boundaries of surface depressions, the methods are able to accurately compute planimetric, volumetric and shape properties for each individual surface depression. The depression tree simplified from contour tree explicitly describes the nested hierarchical structure of a complex depression, the level of composite depression and the overall complexity of a disjoined depression quantitatively. The numerical information about semantic properties and structures of surface depressions are valuable for many applications, such as, simulating and modeling surface runoff and peak stream flows over time in hydrological analysis, determining local and regional water storage capability, estimating water evaporation and infiltration loss, and predicting water volume changes in limnologic and wetland studies, etc.

The reliability and accuracy of the surface depressions detected by embodiments of the method may be influenced by a number of factors. The spatial resolution and vertical accuracy of the original topographical data largely determine the minimum depression size and depth that we can reliably detect and delineate. The detection of smaller and shallower surface depressions demands higher spatial resolution and vertical accuracy of topographic data. The original LiDAR DEM data used in this example has 1 m spatial resolution and a vertical accuracy of 28 cm (RMSE). It should be able to resolve a 2 m or larger surface depression with a depth of over 50 cm according to the Shannon sampling theorem. Since the method is based on the vector-based contour representation, the option of the base contour line and particularly the contour interval would also influence the depression detection result. The selection of a large contour interval will generate few contour lines and increase computation speed of our method, but some shallow surface depressions would be missed during the contouring process. A small contour interval will help to detect shallow depressions, but results in an increased computation. It should be noted that the computed geometric and topological properties of the detected surface depressions in our method are accurate and are not influenced by the selection of the contour interval, because the an incremental expansion algorithm component is included to find the true pour contour. When the contour interval is sufficiently small, the quasi pour contours would be very close to true pour contours, and the incremental expansion of quasi contours may become unnecessary. The location difference between a quasi-pour contour and its true pour contour in gentle and flat terrain would be much larger than that in a steep terrain. As a general guideline, the target minimum size of surface depression to be mapped should be at least two or three times larger than spatial resolution of original topographical data, and the target minimum depth of surface depressions to be mapped should be larger than the contour interval as well as the vertical accuracy of original topographical data.

As in previous raster-based methods, the detected surface depressions could be real surface depressions or artifact depressions due to data noise and data processing errors. Since most artifactual surface depressions are small, shallow, and irregular in shapes, smoothing the original topographical data prior to contouring can help reduce artifact depressions in our method. In addition, after deriving geometric properties for all surface depressions, appropriate threshold values for surface area, depth, and shape index may be selected to find small, shallow and irregular digital depressions to be removed as artifacts.

It should be noted that the reliability of the geometric properties of surface depressions, particularly, depth and storage volume, are subject to the season of topographical data acquisitions. For instance, LiDAR remote sensing generally cannot penetrate water and thick vegetation. LiDAR data acquired during dry and leaf-off conditions on the ground are preferred for depression analysis. Even during the dry season, some surface depressions may be partially covered by water, such as the Agate Lake shown in FIG. 5. In this case, the derived depth and storage volume of the corresponding depressions would be significantly underestimated. The estimated volumetric properties need to be corrected by incorporating other sources of information or simply using the empirical statistical relationship between volume and surface area (see Gleason et al. 2007. Estimating water storage capacity of existing and potentially restorable wetland depressions in a subbasin of the Red River of the North. USGS *Northern Prairie Wildlife Research Center,* 89, incorporated herein by reference).

The true pour contours determined from the incremental expansion of quasi pour contours provide a solid foundation for accurately computing the various geometric properties of individual surface depressions. The depression tree simplified from the local contour tree provides a compact representation of the nested topological structure of complex surface depressions. The combination of planimetric, volumetric and shape properties and the nested hierarchical structures derived from our method provide comprehensive and essential information for various environmental applications, such as fine-scale ecohydrologic modeling, limnologic analyses, and wetland studies. The following examples demonstrate that the localized contour tree method is functionally effective and computationally efficient.

According to other embodiments of the invention, a non-transitory computer readable medium comprising computer-executable instructions for carrying out embodiments of the inventive methods is provided. A DEM based on, for example, LiDAR, is stored and operations may be effectuated on the model. Morphogeographical and morphometric values and thresholds may also be stored in order to characterize detected surface depressions as belong to a surface depression category of interest, for example, Karst sinkholes, wetland potholes, or military field impact craters. FIG. 29 sets forth exemplary computer readable code for implementing a general embodiment of the methods by a computer. The code may be readily adapted to detecting specific surface depressions and/or features by applying, for example, different pre-processing criteria and different morphological data thresholds specific to a depressional feature of interest.

The following Examples illustrate development and implementation of embodiments of the inventive methods in actual studies of surface depressions located in specific topographical landscapes. As will be readily understood by a person of ordinary skill in the art, although specifically exemplified, embodiments of the inventive methods may be applied to detect a wide variety of surface depressions in a wide variety of topographic landscapes, and may be applied longitudinally across time frames to ascertain changes in the number and/or character of surface depressions in an area of interest.

Example 1

Figure 5:
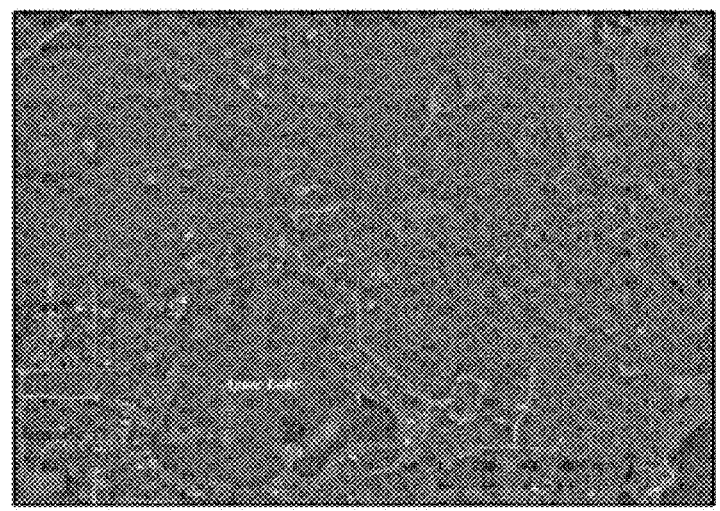
FIG. 5. Map of an illustrative case study area in Crow Wing County, Minnesota.

The following example illustrates an embodiment of the inventive method via a case study of an area in Crow Wing County, Minnesota (FIG. 5).

The rectangular case study area is 3 km long in west-east direction and 2.4 km wide in south-north direction with a total area of 7.2 km². The surface elevation ranges from 373 m to 425 m. It is part of a glaciated plain of the Prairie Pothole Region of North America. There are numerous small surface depressions created by the retreating glaciers. Many of these glaciated surface depressions are covered by pooled water seasonally or permanently, forming a wetland ecosystem and landscape. The LiDAR data for Crow Wing County were acquired on May 9, 2007 (Minnesota Geospatial Information Office 2008), which is freely available from Minnesota Geospatial Information Office. For purposes of the exemplary study, data was accessed September, 2014 from ftp.lmic.state.mn.us/pub/data/elevation/lidar/county/crow-wing/.

Figure 6:
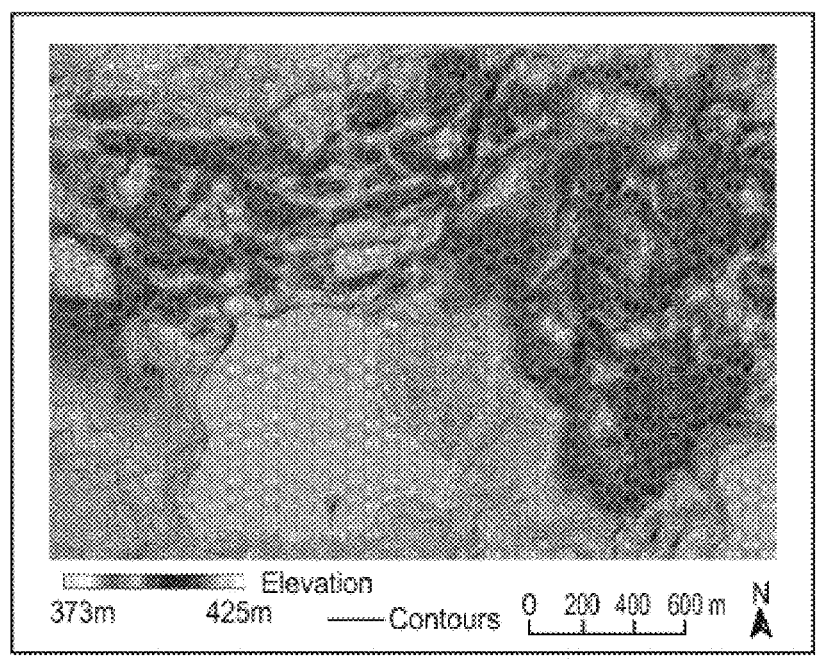
FIG. 6. Shaded relief map with contours for the Crow Wing study area.

The bare-earth LiDAR DEM is in the map projection of Universal Transverse Mercator (UTM) Zone 15N and referenced to horizontal datum-NAD83 and vertical datum NAVD88. The LiDAR DEM has 1 m spatial resolution and its RMSE (root mean squared error) of vertical measurements was estimated to be 28.95 cm based on 118 GPS check points (Merrick & Company 2008). An edge-preserving filter, 3×3 median filter, was used to smooth the LiDAR DEM. The shaded relief map of the bare-earth LiDAR DEM is shown in FIG. 6.

Figure 7:
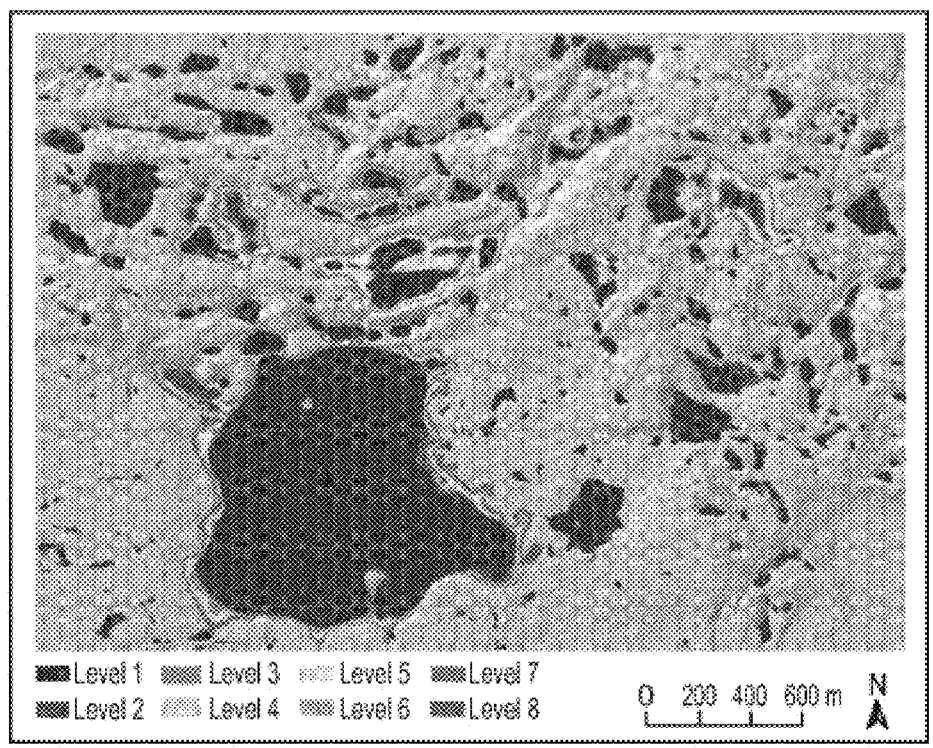
FIG. 7. Localized contour tree depression analysis result for the Crow Wing study area.

Based on the smoothed bare-earth LiDAR DEM, the vector contour representation was generated by setting the base contour to be 370 m and the contour interval to be 0.5 m. The localized contour tree method was then applied to the contours to identify surface depressions. FIG. 7 shows the detected surface depressions and their levels. In total, 267 disjoined surface depressions are detected, in which 244 are single level simple depressions, and 23 are multi-level complex surface depressions. For each disjoined surface depression, their geometric and topological properties have been computed. Table 2 shows the geometric and topological properties of a number of selected surface depressions: a, b, c, d, e, f, g and h (FIG. 7). The summary statistics of all the detected surface depressions for the case study area are shown in Table 3.

these depressions ranged from 101 $m^2$ to 992,113 $m^2$, with a median size of 401 $m^2$. The total surface area of all depressions was 2,021,727 $m^2$, which was larger than that detected by the disclosed method by 0.6%. This is because some shallow surface depressions were not captured and represented by the contour lines with a contour interval of 0.5 m. The Whitebox stochastic depression analysis tool does not have functions to derive geometric properties for individual surface depressions, let alone the nested hierarchical relationships among depressions inside a large complex depression like e shown in FIG. 2B.

Example 2

The following example illustrates use of an embodiment of the inventive method to detect, quantify and characterize sinkholes in a Karst landscape. Specifically, the example illustrates Wrapping karst sinkholes by using a localized contour tree method derived from high-resolution digital elevation data in accordance with embodiments of the

TABLE 2

Geometric and topological properties of selected depressions

| Depression | a | b | c | d | e | f | g | h |
|---|---|---|---|---|---|---|---|---|
| Centroid (lat, lon) | (46.507, −93.924) | (46.510, −93.919) | (46.509, −93.911) | (46.504, −93.902) | (46.509, −93.903) | (46.505, −93.911) | (46.507, −93.896) | (46.497, −93.914) |
| Spill elevation (m) | 396.0 | 386.5 | 392.5 | 405.5 | 399.0 | 393.0 | 405.0 | 384.5 |
| Surface area ($m^2$) | 45,814 | 20,883 | 6,536 | 22,749 | 43,049 | 123,690 | 62,989 | 998,027 |
| Max depth (m) | 16.86 | 7.72 | 5.81 | 5.11 | 10.60 | 12.90 | 19.28 | 5.57 |
| Mean depth (m) | 7.08 | 3.57 | 1.77 | 1.58 | 3.83 | 7.00 | 5.91 | 4.38 |
| Volume ($m^3$) | 324,706 | 74,601 | 11,532 | 36,017 | 165,089 | 865,991 | 372,480 | 4,366,404 |
| Compactness | 0.35 | 0.21 | 0.16 | 0.28 | 0.14 | 0.31 | 0.18 | 0.13 |
| Circularity | 0.82 | 0.49 | 0.35 | 0.67 | 0.35 | 0.81 | 0.54 | 0.76 |
| Asymmetry | 0.05 | 0.77 | 0.80 | 0.34 | 0.59 | 0.59 | 0.52 | 0.12 |
| Complexity level | 1 | 2 | 3 | 4 | 5 | 6 | 7 | 8 |

TABLE 3

Summary statistics of depressions

| | Surface area (m2) | Perimeter (m) | Max depth (m) | Mean depth (m) | Storage volume (m3) |
|---|---|---|---|---|---|
| Minimum | 51 | 40 | 0.16 | 0.05 | 3 |
| Maximum | 998,027 | 8,218 | 19.28 | 7.08 | 4,366,404 |
| Mean | 7,521 | 239 | 2.08 | 0.83 | 31,330 |
| Median | 515 | 113 | 0.79 | 0.31 | 155 |
| Sum | 2,008,230 | 63,694 | NA | NA | 8,365,218 |

Figure 8:
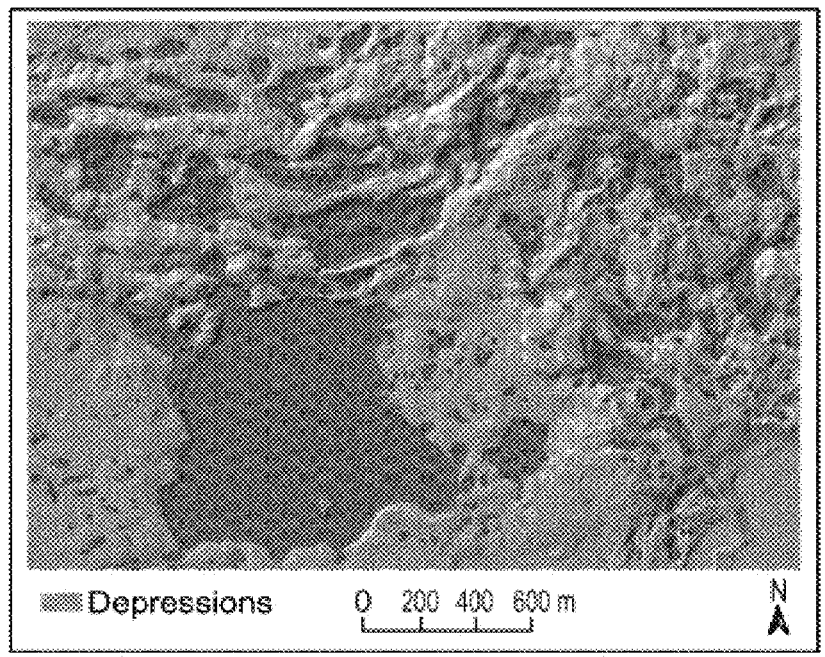
FIG. 8. Whitebox stochastic depression analysis result for the Crow Wing study area.

The surface depressions detected from the local contour tree method are compared to those from the Whitebox stochastic depression analysis tool. The stochastic depression analysis was conducted on the LiDAR DEM grid with 100 iterations. The probability of being part of a surface depression was calculated for each grid cell. Those grid cells with a probability value not lower than 0.7 were considered as real depression cells. Such cells were detected as depression cells 70 or more times out of 100 iterations. Subsequently, the morphology operator was applied to the detected depression cells to remove small erroneous holes and to smooth the boundaries of depressions. FIG. 8 shows the depression features detected by the Whitebox stochastic depression analysis tool. There were 310 disjoined depressions identified with the Whitebox tool. The surface area of invention. The methods permit automated creating and updating sinkhole inventory databases at a regional scale in a timely manner.

Sinkholes are substantially closed depressions in the Earth's surface with internal drainage caused by subsurface dissolution of soluble bedrock in karst landscapes. Sudden sinkhole collapse and gradual ground subsidence phenomenon may cause severe damage to human properties and affect water quality in underlying carbonate acquirers. Consequently, sinkhole inventory mapping is critical for understanding hydrological processes and mitigating geological hazards in karst areas. The reliability of sinkhole susceptibility and hazard maps and the effectiveness of mitigation activities largely rely on representativeness, completeness, and accuracy of the sinkhole inventories on which they are based. In the last f decades, a number of institutions and associations in several states of the United States have developed sinkhole or other karst feature databases mostly integrated in Geographical Information Systems (GIS), including Kentucky, Minnesota, Missouri, and Florida.

However, most previous methods for mapping sinkholes were primarily based on visual interpretation of low-resolution topographic maps (e.g. U.S. Geological Survey 1:24, 000 scale topographic maps) and aerial photographs with subsequent field verification, which are labor-intensive and time-consuming. Moreover, complete field verification of each sinkhole is often impractical, thus the reliability of manually digitized sinkhole data by even the same worker may be questionable. Finally, some previous studies found that sinkholes might be changing fast due to natural or anthropogenic causes such as urban development and agricultural expansion. Therefore, there is a compelling need to automate mapping of sinkholes to update the sinkhole inventory regularly and to detect trending change across the sinkhole landscape.

In recent decades, the advent of airborne Light Detection and Ranging (LiDAR) and Interferometric Synthetic Aperture Radar (InSAR) remote sensing technologies have produced large volumes of highly accurate and densely sampled topographical measurements. The increasing availability of high-resolution digital elevation data derived from LiDAR and InSAR technologies allows for an entirely new level of detailed delineation and analyses of small-scale geomorphologic features and landscape structures at fine scales.

The Study Area

The study area, Fillmore County (FIG. 9), is an active Karst area located in southeastern Minnesota, which is part of the Upper Mississippi Valley Karst. The county has a total area of 2230 km$^2$, which is primarily composed of cultivated crops (41.5%), pasture/hay (21.8%), deciduous forest (18.6%), grassland/herbaceous (11.5%), and developed land (5.4%) according to the National Land Cover Database 2011. Most surficial karst features, such as sinkholes, are only found in those areas with less than 15 m of sedimentary cover over bedrock surface. Since the 1990s, various efforts have been made by the Minnesota Geological Survey and the Minnesota Department of Natural Resources to map karst features and publish various versions of karst feature distribution maps for southeastern Minnesota. Gao et al. (2002) initiated the development of the Minnesota Karst Feature Database (KFDB) for southeastern Minnesota that allows sinkholes and other karst features (springs, stream sinks, etc.) to be displayed and analyzed in a GIS environment. The KFDB is provided as point features in ESRI Shapefile format (Minnesota Geospatial Commons, 2005).

Figure 9:
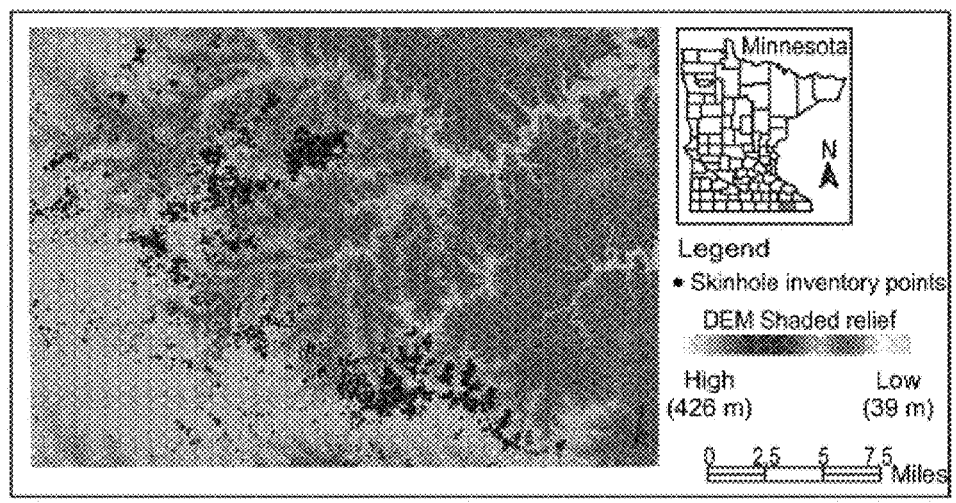
FIG. 9. Distribution of sinkhole inventory points in Fillmore County, Minnesota.

According to the metadata, the latest update to the KFDB was conducted in November 2005, over a decade ago. As of November 2005, 9128 sinkholes had been mapped and recorded in southeastern Minnesota. Of the 9128 sinkholes in the KFDB, 6139 (67.3%) were located in Fillmore County. FIG. 9 shows the sinkhole distribution overlain on the LiDAR DEM shaded relief in Fillmore County. It appears that the majority of sinkholes were highly concentrated on the flat hilltops between or adjacent to river valleys. The flat hilltops in a northwest to southeast band across the central part of Fillmore County are part of an old erosion surface that cuts across the stratigraphy. In Fillmore County, limestone and dolostone underlie most of the County. Fillmore County has been called the "Karst Capital of Minnesota." With 6139 sinkholes and 873 springs that have been mapped, the county is believed to have more Karst features than the rest of southeastern Minnesota combined. However, investigators also report that sinkholes are forming rapidly in southeastern Minnesota due to both natural and anthropogenic processes. It is estimated that the rate of sinkhole formation is about 2% per year of the total inventory of sinkholes. This high rate of formation indicates that many sinkholes are ephemeral features in the landscape, which calls for the needs for regular updating of sinkhole database in the region. A recent study by Rahimi and Alexander (2013) revealed that approximately two-thirds of the inventoried sinkholes in Winona County in southeastern Minnesota have been filled for agricultural use reasons.

LiDAR Data

The LiDAR data for Fillmore County was acquired during Nov. 18-24, 2008 as part of the LiDAR data acquisition project for nine counties in southeastern Minnesota (Minnesota Geospatial Commons, 2008). The bare earth LiDAR-derived DEM is in the reap projection of Universal Transverse Mercator (UTM) Zone 15N and referenced to horizontal datum-NAD83 and vertical datum NAVD88. The LiDAR DEM has 1 m spatial resolution and its RMSE (root mean squared error) of vertical measurements was estimated to be 28.7 cm at a 95% confidence level of all land cover categories. The shaded relief map of the bare-earth LiDAR DEM is shown in FIG. 9. The elevation values range from 39 to 426 m, with an average elevation of 362 m. In addition to the LiDAR data, leaf-off 4-band (red, green, blue, and infrared) digital orthoimagery for validating our sinkhole detection results was utilized. The digital orthoimagery for Fillmore County was flown in mid-April 2011 at 0.5 m resolution. Both data sets can be obtained from the Minnesota Geospatial Commons website.

Methods

Figure 10:
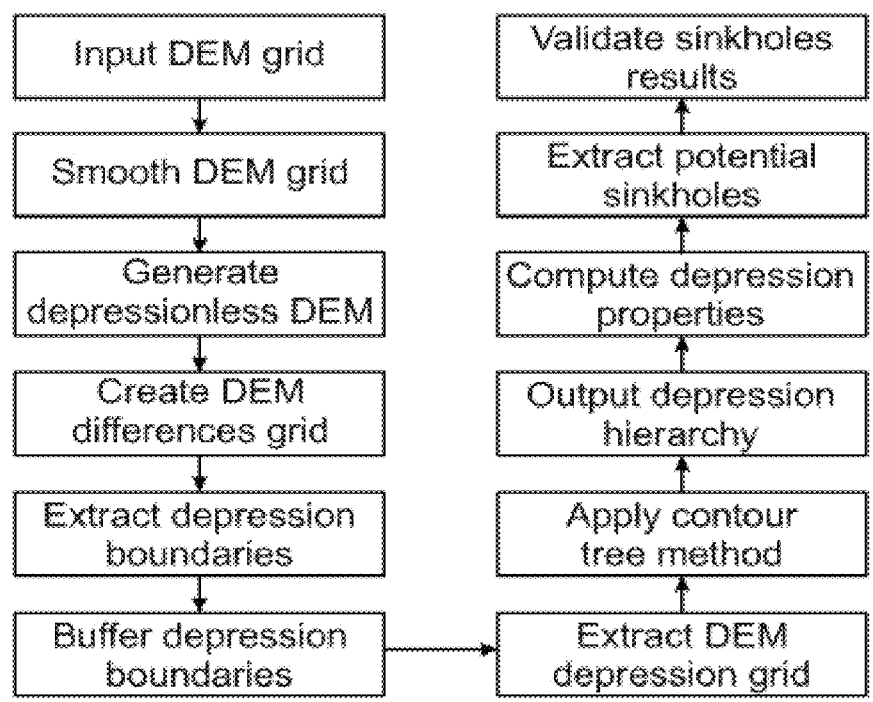
FIG. 10. Flowchart of an embodiment of the inventive methods as applied to detection of sinkholes.

An embodiment of the inventive methods comprising a semi-automated approach was employed. Several steps included: (a) LiDAR DEM preprocessing; (b) depression identification using the localized contour tree method; (c) calculation of morphometric properties of depressions; and (d) sinkhole extraction by eliminating non-sinkhole depressions using morphometric parameters. The flowchart in FIG. 10 sets forth bookmark4 the detailed data processing steps.

LiDAR DEM Preprocessing

The basic assumption for sinkhole detection is that sinkholes are a subset of surface depressions, which might also include other non-sinkhole natural depressions or man-made depressions. Since the localized contour tree method is a vector-based method applied to the LiDAR DEM, the purpose of this preprocessing step is to extract a subset of the original LiDAR DEM that represents surface depressions. In this way, those non-depression areas will be eliminated from the analysis as they are unlikely to be sinkholes. This can greatly reduce the number of contours being generated and thus reduce the computation time.

As data noise or errors in the DEM may lead to jagged, irregular or fragmented contour lines, a 3×3 median morphological operator was used to smooth the LiDAR DEM. The median operator is an edge-preserving filter that is used to reprove data noise and suppress small artifact depressions without distorting the boundaries of true surface depressions, and is considered better than a mean (averaging) filter. After smoothing the original DEM with the median filter, the efficient depression filling algorithm developed by Wang and Liu (2006) was used to generate a new filled DEM. The algorithm identifies and fills surface depressions by spill elevation and integrating the priority queue data structure into the least-cost search of spill paths. It has been widely adopted and implemented in several GIS software packages due to its high computation efficiency and coding simplicity. By subtracting the original DEM from the resulting filled DEM, a new elevation difference grid is generated representative of depression location and depths. The elevation difference grid is converted into polygons without boundary simplifications in order to make the polygon boundaries exactly match pixel edges. After converting raster to polygon, the polygon may undergo a buffer analysis to make sure most of the contour lines are closed, especially at the edge of the study area. The polygon layer is used as a mask to extract a subset of the smoothed LiDAR DEM representing depression regions.

Depression Identification

Based on the subset of the smoothed LiDAR DEM representing depression areas, vector contours were generated by setting the base contour to be 39 m and the contour interval to be 0.5 m, which is slightly greater than the vertical accuracy of the LiDAR DEM with an RMSE value of 28.7 cm. An embodiment of the localized contour tree method was then applied to the contours to identify surface depressions. A minimum depression area of 100 m$^2$ and a minimum depression depth of 0.5 m were used, which allows identification of sinkholes that are larger than 100 m$^2$ and deeper than 0.5 m. The area and depth thresholds were selected as sufficient to identify most natural sinkholes in the study area.

Figure 11A:
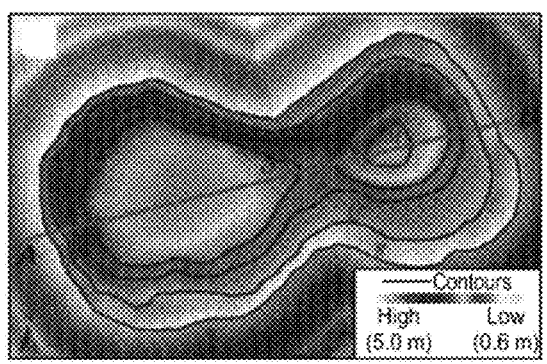
FIG. 11A. Contour representation overlain on a shaded DEM for an illustrative compound depression.
Figure 11C:
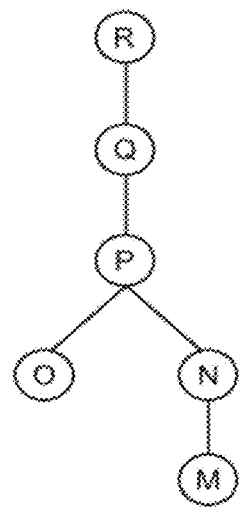
FIG. 11C. Local contour tree for the compound depression.
Figure 11B:
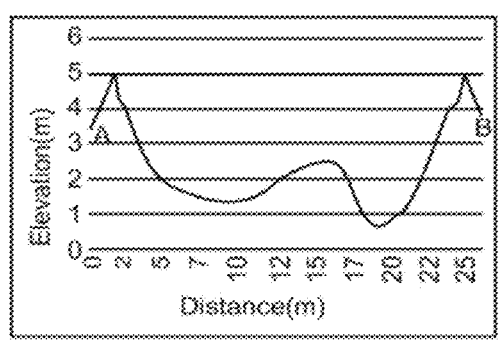
FIG. 11B. Elevation profile graph of a transect of the same compound depression.

In the contour maps, depressions are represented as closed contours that are surrounded by other closed contours at a higher elevation. Only closed contours are kept for further analysis while open contours that do not form a loop are eliminated from further analysis. Topology between closed contours is then constructed. Specifically, each closed contour is attributed with its adjacent outward contour, if any, and the corresponding contour elevation. To facilitate the algorithm for fast searching of depressions, the "seed contours", which are defined as closed contours that do not enclose any other contours, are initially identified. FIG. 11A shows an example of a compound (this term is used interchangeably with complex and composite) surface depression, and the elevation profile of the transect A-B is shown in FIG. 11B. It appears that the compound depression has two smaller depressions nested inside. As shown in FIG. 11A, contours M and O are seed contours whereas contours N, P, Q, and R are not. The seed contours serve as the starting point to search outwards for other associated closed depression contours, which are identified as the 1st rank contours. Assuming that the water level increases inside the depression, the water will spill out of the depression at a certain threshold, which is defined as the spilling elevation of a depression. In other words, the spilling elevation of a depression is the highest elevation for water ponding. Beyond the spilling elevation, the ponded water spills. If two or more adjacent depressions (1st rank) share the same spilling elevation, they will be merged and form a 2nd rank depression (FIG. 11A). Similarly, a further combination of 2nd rank depressions forms even higher level depressions. Whenever two or more depressions merge, a higher rank of depression is created.

According to the model, the topological relationships between depressions (contours and their bounded regions) are represented by a contour tree. Contours are mapped as nodes and interstitial spaces as links. The nodes in the tree graph represent contours, and the link (edge) between nodes represents the adjacency and containment relationships between contours. In the contour tree, splitting and merging of nodes represent the change in topology. As shown in the contour tree graph in FIG. 11C, contour (depression) N encloses the depression seed contour M (1st rank), and there is no topological change between them. Therefore, contour N is also determined as the 1st rank contour, the same rank as the depression seed contour M. With the water level increasing, the depressions (contours) N and O merge to form a 2nd rank depression P.

Figure 11D:
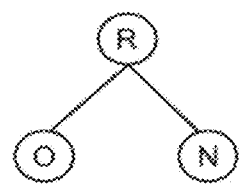
FIG. 11D. Simplified local contour tree for the compound depression.

This iterative procedure continues until all the depression seed contours and their outward closed contours are processed and depression ranks are determined accordingly. In the perspective of graph theory, the hierarchical relationships of nested depressions inside a compound depression constitute a tree. The most outward contour of the compound depression is the root of the tree, the directed links between adjacent contours a the edges of the tree, and seed contours are the leaf nodes of the tree. The depression seed contours are used as the starting point to search outwards to minimize search time for establishing the tree or forest of trees. Compared to the global contour tree method described in Wu et al. ("An Effective Method for Detecting Potential Woodland Vernal Pools Using High-Resolution LiDAR Data and Aerial Imagery" *Remote Sensing*, (2014) 6(11), 11444-11467, incorporated herein by reference), the localized contour tree method is more effective and computationally efficient. Instead of creating a single global tree for the entire area, the localized contour tree algorithm constructs a forest of trees. Each tree represents one compound depression, and the number of trees in the forest represents the number of compound depressions for the entire area. A simple surface depression (1st rank) constitutes a single-branch contour tree, while a compound surface depression is represented by a multi-branch contour tree. For example, the corresponding contour tree for the compound depression shown in FIG. 11A is a multi-branch tree (FIG. 11C). To explicitly represent the nested hierarchy of a compound surface depression, the contour tree is simplified by removing those nodes without topological change. Only those nodes with topological changes (immediately before merging) are kept in the simplification. It should be noted that the root node of the contour tree is always kept in the simplification since it represents the maximum boundary of the compound depression. After simplification, the multibranch contour tree shown in FIG. 11C is reduced to a smaller compact tree with only three nodes (FIG. 11D). The leaf nodes of the simplified contour tree represent two simple depressions (N and O) at the 1$^{st}$ rank. The parent (root) node represents the compound depression (R) at the 2nd rank. The simplified contour tree gives a clear representation of the nested hierarchical structure of a compound surface depression.

Calculation of Depression Characteristics

Figure 12:
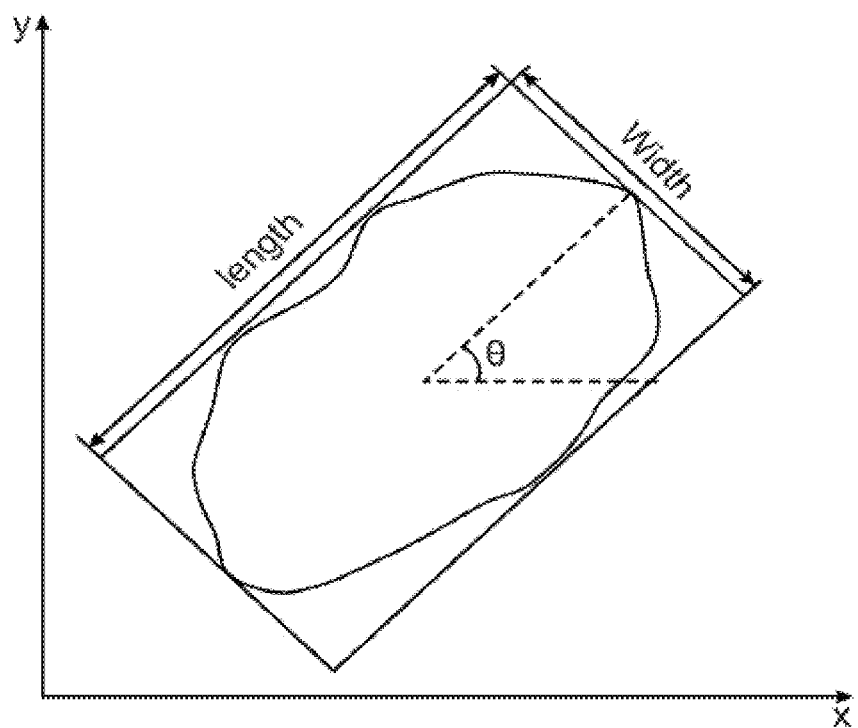
FIG. 12. Illustration of a fitted minimum bounding rectangle for a surface depression.

After identifying surface depressions and quantifying their ranks according to their topological relationships, basic morphometric characteristics for each depression at each rank are calculated, including in this specific embodiment, the width (w), length (l), area (A), perimeter (p), depth, volume, elongatedness (ELG), compactness index (CI), and standard deviation of elevation (STD). The method by Chaudhuri and Samal (2007) was adopted to compute the minimum bounding rectangle for each depression polygon. The depression length was defined as the length of the major axis and the depression width was defined as the length of the minor axis of the fitted minimum bounding rectangle (FIG. 12). The perimeter is the length of the contour that delimits the sinkhole in plain view, and the sinkhole area is considered as the planimetric surface bounded by the perimeter. Depth is defined as the maximum depth between the sinkhole edge and the deepest point within the sinkhole. STD calculates the standard deviation of all cells in the DEM that belong to the same depression. ELG is defined as the ratio between the length and width of the fitted minimum bounding rectangle:

$$ELG = l/w \qquad \text{[Equation 1]}$$

A circle and square will have the smallest value for ELG. Basso et al. (2013) classified sinkholes into four groups according to ELG: (i) circular and sub-circular (ELG≤1.21); (ii) elliptical (1.21 b ELG≤1.65); (iii) sub-elliptical (1.65 h ELG≤1.8); and (iv) elongated (ELG N 1.8). CI is a widely used shape indicator (see Davis, 2002) defined by e perimeter and area of the object:

$$CI = 4\pi A/p^2 \quad \text{[Equation 2]}$$

The most compact object in a Euclidean space is a circle. A circle-shaped object has a compactness index of unity. The compactness index is also known as the circularity measure (see Pratt, 1991). The abovementioned morphometric; properties were examined to identify threshold values that could be used to filter out non-sinkhole/spurious depressions.

Sinkhole Extraction Analyst

To streamline the procedures for automated sinkhole extraction, the method has been implemented as an ArcGIS toolbox—Sinkhole Extraction Analyst, which will be available for the public to download free of charge in the near future. The core algorithm components are developed using the Python programming language. The toolbox includes two tools: Depression Identification Tool and Sinkhole Extraction Tool. The Depression Identification Tool asks the user to provide a single input, the LiDAR DEM, and then executes the aforementioned procedures with user-specified parameters such as the base contour, contour interval, minimum depression area, and minimum depression depth to automatically create depression polygons at different ranks. The Sinkhole Extraction Tool selects and exports potential sinkholes based on user-specified criteria related to the area, depth, STD, LTG, CI, etc. All depression and sinkhole results can be saved as ESRI Shapefile or Geodatabase format.

Results

Using the localized contour tree method with certain relevant parameter values (contour interval=0.5 in; base contour=39 m; and minimum area=100 m$^2$), 14,499 depressions were identified at 1st rank from the LiDAR-derived DEM in Fillmore County, nearly three times greater in number than the inventoried sinkholes in the KFDB. The number of 2nd, 3rd, 4th, and 5th rank depressions were 1668, 235, 75, and 17, respectively. Depressions detected using the localized contour tree is a combination of sinkholes and other natural or man-made depressions, including stream channels, ponds, retention basins, and road ditches. Thus, the next step is to extract potential sinkholes from these detected depressions.

Figure 13:
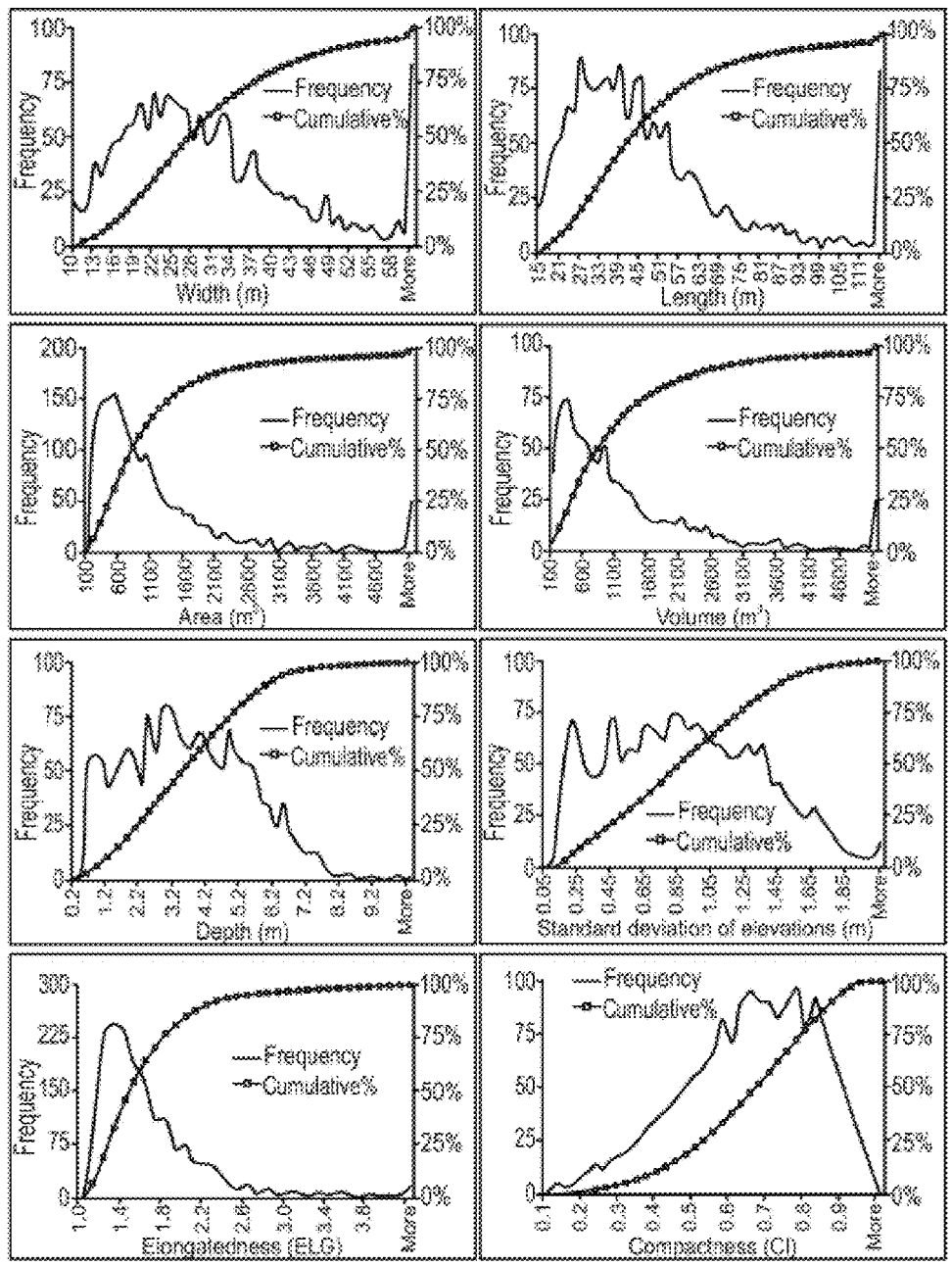
FIG. 13. Histograms of representative morphometric characteristics width, length, area, volume, depth, standard deviation of elevations, elongatedness and compactness for 1784 $1^{st}$ rank training sinkholes.

Sinkholes vary in size, shape and distribution in different regions of the world. Consequently, sinkholes are defined differently in literature. For instance, Karst solution sinkholes in southwest Slovenia have been defined as having more than 2 m deep basins with more than 10 in diameter. Mukherjee (2012) used a 4-m depth threshold to locate sinkholes in Nixa, Mo., while Zhu et al, (2014) considered a 6-m depth threshold sufficient to identify most natural sinkholes in the Floyds Fork watershed in central Kentucky. In Fillmore County, Witthuhn and Alexander (1995) reported that sinkholes ranged from b 1 m to N30 m in diameter and 0.3-18 m in depth; the majority of them were 3-12 in in diameter and 1.5-12 m deep. This estimation was based on a limited number of sinkholes surveyed in the field as only sinkhole locations have been recorded in the KFDB. No data about sinkhole boundaries for Fillmore County has been reported in the literature. By intersecting the KFDB sinkhole points layer with the depression polygons layer generated from the localized contour tree method, it was found that 1858 (30.3%) out of 6139 inventoried sinkholes in the KFDB were located within 1784 depressions (1st rank). These intersected depressions were considered as the "training sinkholes" in the present study, as they were considered very likely to be true sinkholes due to coincident locations with the KFDB. The histograms and summary statistics of morphometric properties of the 1784 training sinkholes are shown in FIG. 13, and FIG. 14, Table 4, respectively.

Based on summary statistics of the 1784 training sinkholes, it appeared that most sinkholes ranged from 169 m$^2$ (5th percentile) to 3696 m$^2$ (95th percentile) in size and from 0.73 m (5th percentile) to 6.55 m (95th percentile) in depth. The median size and depth are 751 m$^2$ and 3.37 m, respectively. The former is approximately equal to the size of a circle with 30 m in diameter, which can be evidenced from the median width (27.1 m) and length (40.7 m) based on the minimum bounding rectangle. The standard deviation of elevations within each depression ranged from 0.18 m (5th percentile) to 1.64 m (95th percentile). Most training sinkholes had CI values greater than 0.31 and ELG values less than 2.54.

Figure 17A:
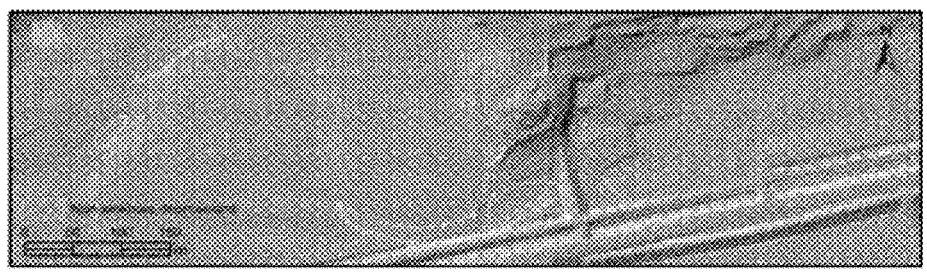
FIG. 17A. Examples of on-sinkhole depression polygons overlain with LiDAR DEM shaded relief.
Figure 17B:
FIG. 17B. Color infrared aerial imagery.

In order to reline the detected depressions down to those which may represent "true" sinkholes, a combination of morphometric; parameters based on the summary statistics of the 1784 training sinkholes: area b 4000 m$^2$, depth N 0.5 m, STD N 0.18 m, ELG b 2.54, and CI N 0.31 was employed. Since most natural sinkholes tend to have circular or elliptical shape, the criteria of ELG b 2.54 and CI N 0.31 eliminated many elongated depression features that appeared to be stream channels, road ditches, and other man-made or natural features that were less likely to be sinkholes. Water-filled ponds usually have flat bottoms in the LiDAR DEM, resulting in depressions with low STD. Using the threshold of STD N 0.18 m, water-filled ponds and other hydro features were removed from consideration as potential sinkholes. Using these criterions, the method was able to distinguish sinkholes from other non-sinkhole depressions. Some examples of non-sinkhole depressions are shown in FIGS. 17A and 17B.

Figure 18A:
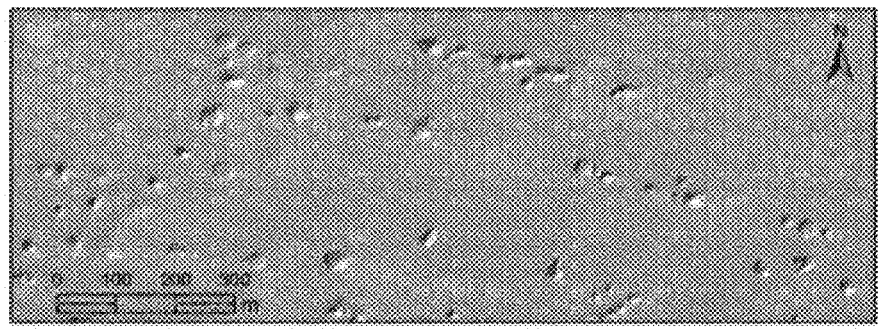
FIG. 18A. An LiDAR DEM shaded relief.
Figure 18B:
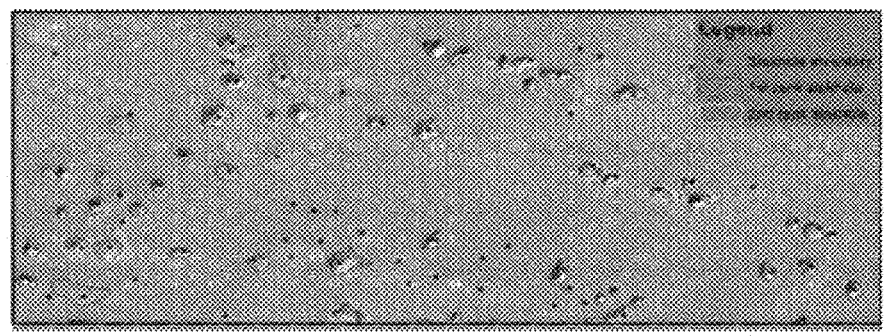
FIG. 18B. Examples of extracted sinkhole boundaries overlain on the LiDAR DEM shaded relief.
Figure 18C:
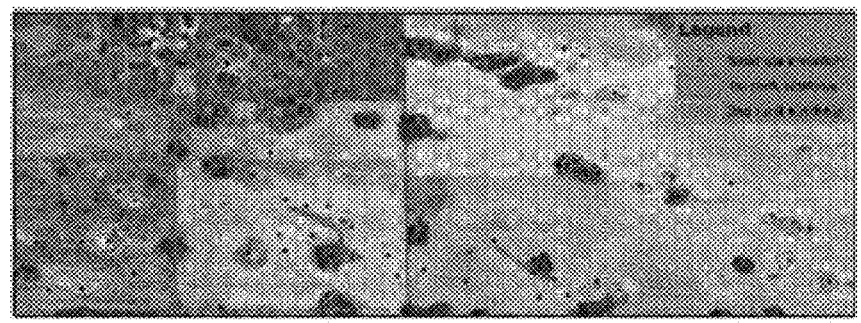
FIG. 18C. Color infrared aerial imagery of the same area.

After applying the sinkhole extraction criteria area h 4000 m$^2$, depth N 0.5 STD N 0.18 in, ELG b 2.54, and CI N 0.31), the numbers of detected sinkholes of 1st, 2nd, 3rd, and 4th rank in the study area were 5299, 208, 37, and 10, respectively. Visual assessment of the results shows that the localized contour tree method is a very effective approach to identify sinkholes in the region. FIG. 18C shows some examples of extracted sinkhole boundaries overlain on the LiDAR DEM shaded relief and color infrared aerial imagery. Apparently, a large number of Karst sinkholes were found under a dense forest or tree canopy. Those inventoried sinkholes not captured by the LiDAR data appeared to have been filled due to agricultural use or other reasons.

FIG. 15/Table 5 provides a summary statistics of the extracted sinkholes at four different ranks. The identified 1st rank sinkholes have an aggregate area of 4.38 km$^2$, representing approximately 0.2% of the total land area of Fillmore County. The average area is 827 m$^2$ per sinkhole, which is the same as a circle with a diameter of 32.5 m. Median width and length of sinkholes increased with the sinkhole rank from 22.9 m at 1st rank to 25.4 m at 4th rank and from 35.5 m at 1st rank to 234.7 in at 4th rank, respectively. The median maximum depth of sinkhole ranged from 1.98 m at 1st rank to 5.69 in at 4th rank, while the deepest sinkhole at 4th rank reaching a depth of 8.18 in. The area of 1st rank sinkholes ranged from 100 to 3991 m$^2$, with a median size of 543.31 m$^2$. Following the classification of sinkholes according to Basso et al. (2013), 16.3% of 1st rank sinkholes were circular, 56.0% were elliptical, and 27.6% were elongated. Similarly, the lower rank sinkholes were much more compact according to the compactness index with a gradual decrease from 1st rank to 4th rank.

FIG. 16/Table 6 shows the comparison between inventoried sinkholes in the FDB and sinkholes detected from the LiDAR DEM using the localized contour tree method. Out of the 6139 inventoried sinkholes in Fillmore County recorded in the KFDB, 1858 (30.2%) were successfully captured by the LiDAR data using the localized contour tree method for depression identification (see column "KFDB Detected" in Table 6). In order to evaluate the performance of LiDAR data for sinkhole mapping, the National Land Cover Database (NLCD) (2011) was incorporated into the analysis. The land cover types in Fillmore County are dominated by cultivated crops (41.5%), followed by pasture/hay (21.8%), deciduous forest (18.6%) and grassland/herbaceous (11.5%). FIG. 9 clearly shows that the majority of sinkholes were highly concentrated on flat hilltops between or adjacent to river valleys. The primary land cover type associated with these flat hilltop areas was cultivated crops. In other words, the majority of sinkholes were distributed in the agricultural land areas. A total of 2815 (45.9%) inventoried sinkholes in the KFDB were located within agricultural crops, followed by 1651 (26.9%) in grassland/herbaceous and 849 (13.8%) in pasture/hay. Only 414 (6.7%) inventoried sinkholes were found to be located in deciduous forest.

On the contrary, 1007 (19.0%) out of 5299 1st rank sinkholes detected using the inventive localized contour tree method were located in deciduous forest. Among these forested sinkholes, 891 were new sinkholes that had not been recorded in the KFDB. This dramatic increase can be attributed to the capability of LiDAR for penetrating through vegetation canopy, which enables mapping small Karst features like sinkholes with much less interference from vegetation than aerial photography. However, only 1259 (23.8%) sinkholes were detected in agricultural areas, compared to 2815 in the KFDB. The possible explanation for this striking decline is that many sinkholes have been filled due to agricultural use or other man-made reasons. It was found that 3645 (59.4%) out of 6139 sinkholes in the KFDB were not located in the depression areas of the LiDAR DEM. This indicates that more than half of the inventory sinkholes were no longer depression features, and could not be captured by LiDAR.

Figure 19A:
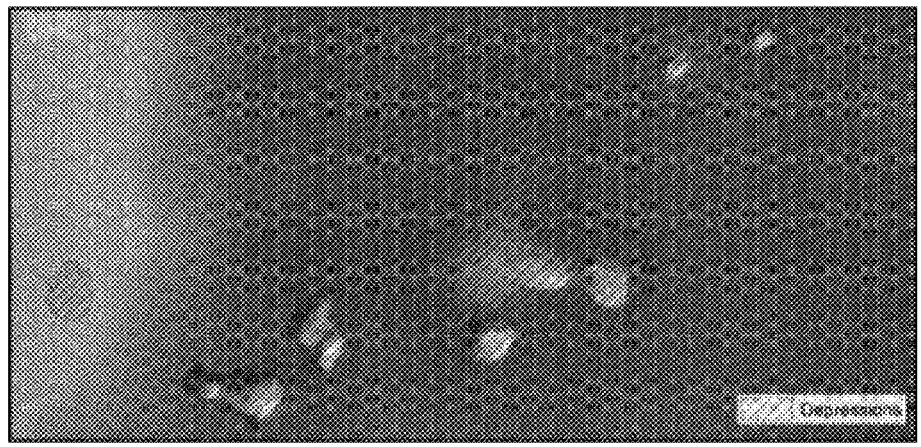
FIG. 19A. Sinkhole boundaries delineated using the sink-filling method.
Figure 19B:
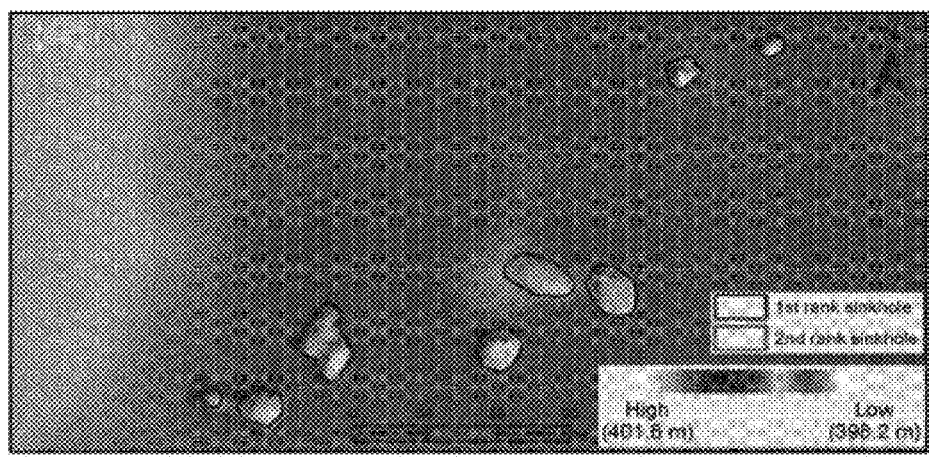
FIG. 19B. Sinkhole boundaries delineated using the localized contour method.

The localized contour tree method for detecting sinkholes is fundamentally different from the previous raster-based methods for sinkhole mapping (e.g. Mukherjee, 2012 and Zhu et al. 2014). The inventive methods more explicitly derive geometric and topological properties of sinkholes. FIGS. 19A and 19B illustrate the differences of sinkhole detection results between the inventive localized contour tree method and the traditional sink-filling method. It is clear that many small sinkholes from the traditional method are nested within larger surface depressions. For example, the largest surface depression (area=14,327 m$^2$) in the center of FIG. 19A enclosed three smaller sinkholes inside. The sinkhole extraction criteria above (area b 4000 m$^2$) would disqualify this largest depression from being considered as a potential sinkhole. Therefore, those three smaller sinkholes nested within the depression would also be eliminated accordingly using the sink-filling method. On the contrary, the inventive contour tree method provides a much more accurate and reliable sinkhole mapping results as demonstrated in FIG. 19B.

Summarily the exemplified embodiment of the method specifically adapted for detecting sinkholes comprises (1) extracting a subset of DEM representing depression areas instead of using the whole DEM for the area to generate contours, which reduces the number of contours being generated and greatly reduces the computation time; and (2) calculating morphometric properties specifically relevant to sinkholes to provide critical information in addition to locations. The algorithms are implemented as an ArcGIS toolbox—Sinkhole Extraction Analyst. In addition to detecting sinkhole locations, the localized contour tree method allowed for extracting sinkhole boundaries and quantifying sinkholes at different ranks across different spatial scales. Although a simple thresholding method eras used to extract potential sinkholes from surface depressions, other machine learning-based methods such as decision tree and random forest could also be employed to facilitate sinkhole detection susceptibility mapping, depending on the availability and quality of sinkhole training data.

It should be noted that the localized contour tree might not detect some shallow depressions whose depths are less than the contour interval, as these depressions might be absent from the contour maps even when these features actually exist in the landscape. This is the intrinsic limitation of DEM contouring. The number of artifact depressions resulted from LiDAR DEM error are effectively reduced by setting appropriate thresholds of surface area and depth of depressions. As recommended by Li et al. ("Lidar DEM error analyses and topographic depression identification in a hummocky landscape in the prairie region of Canada" *Geomorphology*, 129(3-4), 263-275 (2011), incorporated herein by reference) soil and climate conditions of a study site, the process of interest and the scope of the study an need to be taken into account when making the decision on selecting appropriate area and depth thresholds. The present example focused on potential sinkholes that were larger than 100 m$^2$; ever the method may be readily tailored to identify smaller sinkholes when liner-resolution DEMs become available.

LiDAR data flown during dry conditions on the ground is preferred for depression identification and sinkhole detection. LiDAR generally cannot penetrate water, meaning that topography of inundated depressions could not be captured by LiDAR data. This might result in true sinkholes covered with water not being detected if solely based on LiDAR data. The color infrared aerial photographs acquired in leaf-off conditions can facilitate the validation of sinkhole detection results when field verification is impractical. The acquisition date differences between LiDAR data and aerial photographs should be taken into account when sinkhole occurrences are not consistent between different data sets. Human development and land use practices, such as new residential development or agricultural expansion, could result in disappearance of sinkholes from the landscape. These new developments in the landscape might not be reflected in the LiDAR data or aerial photographs if they were acquired before these developments.

Example 3

The following example illustrates an embodiment of the inventive methods directed to identifying wetland depressions.

The Prairie Pothole Region of North America is characterized by numerous, small, wetland depressions that perform important ecological and hydrological functions. Recent studies have shown that total wetland area in the region is decreasing due to cumulative impacts related to natural and anthropogenic changes. The impact of wetland losses on landscape hydrology is an active area of research and water/resource management. Various spatially distributed hydrologic models have been developed to simulate effects of wetland depression storage on peak river flows, frequently using dated geospatial wetland inventories.

One embodiment of the invention provides a novel method for identifying wetland depressions and quantifying their nested hierarchical bathymetric/topographic structure using high-resolution light detection and ranging (LiDAR) data. The novel contour tree method allows identified wetland depressions to be quantified based on their dynamic filling spilling merging hydrological processes. In addition, wetland depression properties, such as surface area, maximum depth, mean depth, storage volume, etc., can be computed for each component of a depression as well as the compound depression. The inventive method provides more realistic and higher resolution data layers for hydrologic modeling and other studies requiring characterization of simple and complex wetland depressions, and helps prioritize conservation planning efforts for wetland resources.

Figure 20:
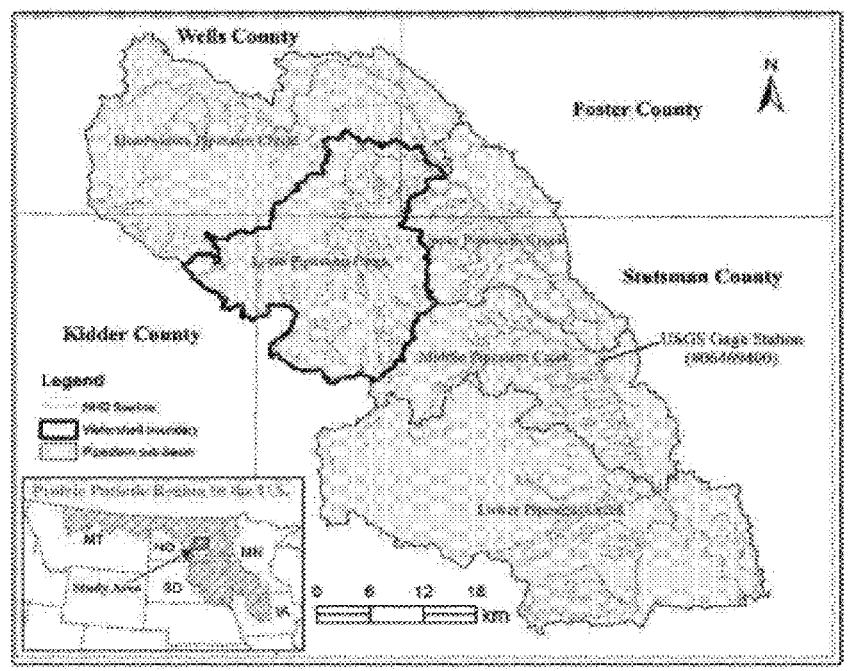
FIG. 20. Map showing the location of the Little Pipeste Creek waters North Dakota.

The Little Pipestem Creek watershed in North Dakota was selected as an appropriate exemplary study area. The Prairie Pothole Region (PPR) of North America encompasses an area of approximately 715,000 $km^2$, including portions of Canada and the state of Minnesota, Iowa, North Dakota, South Dakota, and Montana in the U.S. (FIG. 20). The PPR is characterized by millions of wetland depressions created by the last glacial retreat more than 10,000 years ago. These wetland depressions are typically small and shallow, with an estimated median size of 1,600 $m^2$ and depths generally less than one meter (Huang et al. 2011). They vary in ponded water permanency, expressing ephemeral, temporal, seasonal, semi-permanent, and permanent hydroperiods, depending on precipitation patterns, soil conditions, and contributing area. These depressional potholes have the capability to retain a considerable amount of water which may or may not be released to contribute to overland flow. Extent and distribution of these depressions, as well as antecedent water stored within them, control the area contributing to the basin outlet. The water supplied to potholes is largely from direct precipitation, surface inflows from upland, and near-surface groundwater seepage. Water losses from potholes are primarily driven by evapotranspiration (ET) during summer, with net ET typically exceeding net precipitation during the growing season. Since depressional potholes are relatively small in size, shallow in depth, and dependent largely on precipitation and ET, most are ephemeral. As a result, depressional potholes in the PPR are especially sensitive to natural climatic variability, human-induced climate change, and human modification of land-surface hydrology (e.g., ditches and draining), making them one of the most dynamic hydrological systems in the world. In part, due to their hydrology, however, they are also among the most vulnerable systems.

It is estimated that the lower 48 states in the U.S. lost an approximate 53% of their original wetland area between the 1780s and the 1980s. The latest report on the status and trends of prairie wetlands (Dahl 2014) estimated that total wetland area declined by 301 $km^2$ or 1.1% in the PPR between 1997 and 2009, primarily driven by cumulative impacts from altered hydrology and associated anthropogenic changes such as draining, ditching or filling of depressions. The extensive alteration and reduction of wetland depressions have been found to be partially related to the increasing magnitude and frequency of flood events along rivers in the PPR.

In past decades, numerous wetland hydrology studies have been undertaken in the PPR. Depression storage is a dominating storage element in the PPR, as well as other areas of the U.S., where it accounts for most of the retention on a watershed surface. While several researchers have focused on identifying topographic depressions for hydrologic modeling and wetland studies, the present inventors are not aware of any studies quantifying depression storage hierarchy in potholes resulting from changing water levels within these systems. This lack of fine-scale detail can create errors within hydrological models when models do not account for intra-depression hierarchical hydrodynamics.

Before the advent of digital elevation models (DEMs), the values of depression storage were usually assumed or indirectly estimated due to practical difficulties in making direct measurement of the basin morphology of individual depression. With increasing availability of high-resolution DEMs derived from light detection and ranging (LiDAR) data, depression storage can now be accurately measured, as LiDAR-derived DEMs are often capable of representing actual depressions in the landscape because of their fine scale and high horizontal and vertical accuracies (Wu et al. 2014, 2016). The traditional approaches to identifying surface depressions assume that overland flow nitiates after all surface depressions are fully filled. In reality, surface depressions may be filled gradually due to different input conditions, which results in a dynamic filling, spilling, and merging of intra-depression topographic features affecting hydrological processes (Yang and Chu, 2013).

A localized contour tree method in accordance with embodiments of the invention was developed and used to identify pothole depressions and characterize their nested hierarchical structure based on a high-resolution LiDAR DEM. Unique features of this innovative depression delineation and characterization algorithm include: (1) accounting for dynamic filling, spilling, and merging hydrologic processes that are not considered in current depression identification algorithms; (2) representing and visualizing topological relationships between depressions using the contour tree graph, clearly showing the nested hierarchical structure of depression complexes; and (3) characterizing depression geometric properties (e.g., maximum and average depth, perimeter, surface area, and depression storage, etc.). These features provide important and improved inputs for hydrologic modeling and watershed management.

The Study Area

The selected Little Pipestem Creek watershed study area is located within the 2,770 $km^2$ Pipestem River sub-basin, which is part of the Missouri River Region—James River Sub-Region. The Little Pipestem Creek watershed is a 10-digit (#1016000202) Hydrologic Unit Code (HUC) system with an approximate area of 506 $km^2$, covering parts of four counties (Foster, Kidder, Stutsman, and Wells) in North Dakota (see FIG. 20). Land-use and land-cover data (Table 7 set forth in FIG. 23A) derived from the National Land Cover Database 2011 characterizes the watershed as dominated by Herbaceous (35.9%) and Cultivated Crops (35.1%), with considerable amounts of Open Water (9.4%) and Emergent Herbaceous Wetlands (5.9%). The area is further characterized by a temperate and humid climate with an average annual precipitation of 40 cm.

The landscape is hummocky and contains numerous closed wetland depressions. Most wetlands are inundated or saturated for a relatively short period in the spring following snow-melt. The period of maximum water depth varies with inter-annual fluctuations in weather conditions, but typically takes place in March and April when evapotranspiration remains relatively low but basins are receiving snowmelt inputs. Stream flows are typically highest during February through April (Shook and Pomeroy 2012), as a result of snowmelt.

Datasets

Several high-resolution remotely sensed data sets were utilized, including the bare-earth LiDAR DEM, LiDAR intensity imagery, color-infrared aerial photographs, and National Wetlands Inventory (NWI) maps (Table 8 set forth in FIG. 23B).

Figure 21A:
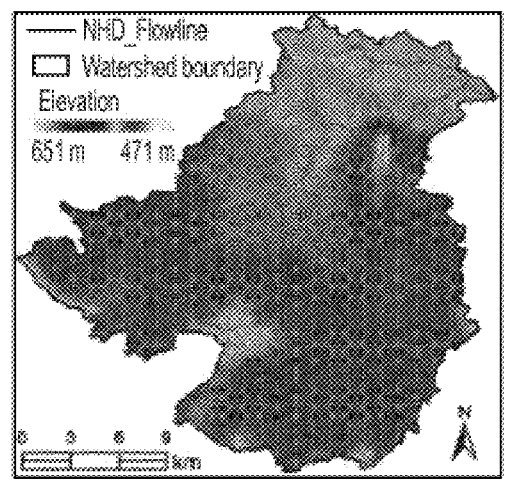
FIG. 21A. A shaded relief map of the LiDAR-derived bare earth DEM from the Little Pipestem Creek watershed 2011.

The LiDAR data was collected with a Leica sensor ALS60 from Oct. 27, 2011 to Nov. 3, 2011 as part of the James River Basin LiDAR acquisition campaign, a collaborative effort among the US Army Corps of Engineers, US Fish and Wildlife Service, Natural Resources Conservation Service, and North Dakota State Water Commission. The LiDAR-derived bare-earth DEMs were distributed through the North Dakota LiDAR Dissemination Service (website lidar.swc.nd.gov) as 2,000 m×2,000 m tiles with 1-m pixel resolution. The LiDAR DEM was in the Universal Transverse Mercator (UTM) Zone 14 N map projection referenced to NAD83 and NAVD88 horizontal and vertical datums. The overall vertical accuracy assessment at the 95% confidence level of the LiDAR DEM was reported to be 15.0 cm on open terrain. The Little Pipestem Creek watershed study area was composed of 164 DEM tiles. The Dynamic Raster Mosaicking function in ArcGIS (ESR1, Redlands, Calif., version 10.2) was used to create a mosaicked dataset that combined the 164 DEM tiles as a seamless 1-m raster for all subsequent image analyses and map generation. The shaded relief map of the LiDAR-derived bare-earth DEM with National Hydrography Dataset (NHD) flowlines overlaid on top is shown in FIG. 21A. The elevation of the watershed ranges from 471 to 651 m, with relatively high terrain in the south and low terrain in the north. Streams and rivers flow northwards and merge into the Pipestem Creek (see NHD flowlines in FIG. 21A).

It should be noted that the reliability of LiDAR-based geometric properties of wetland depressions, particularly water surface area and storage volume, are affected by antecedent water storage and dense vegetation. The LiDAR data were acquired during leaf-off conditions, with no measurable precipitation for the week prior to the LiDAR campaign (NOAA National Climate Data Center at www.ncdc.noaa.gov, accessed Dec. 16, 2014), though field-based inspections of surface hydrology was not conducted.

Figure 21B:
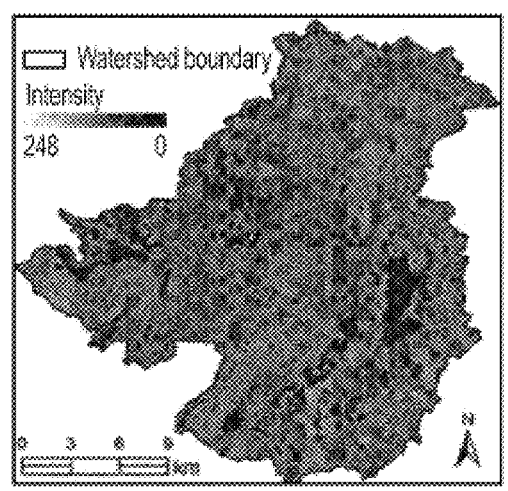
FIG. 21B. LiDAR intensity imagery.

LiDAR intensity data were simultaneously collected with the LiDAR elevation point clouds during the acquisition campaign. The intensity is a measure of the return signal strength of the laser pulse that generated the point, which is largely determined by the reflectivity of materials within the light path. Intensity data can be used to identify different types of materials on the ground, especially when those features have distinct reflectance in the partition of the electromagnetic spectrum detected by the sensor (Lang and McCarty, 2009). Since most topographic LiDAR sensors operate in the near-infrared wavelengths, which tend to be absorbed by water, the return amplitude from water is typically very weak. As a result, waterbodies tend to be characterized as very dark features in the LiDAR intensity image (FIG. 21B). The intensity value ranges for the LiDAR intensity imagery in our study area ranged from 0 to 248. The LiDAR intensity data were primarily used for identifying existing waterbodies in the study area, though it can also serve as a substitute for aerial imagery when none is available to validate wetland depressions delineated from LiDAR DEMs.

Figure 22A:
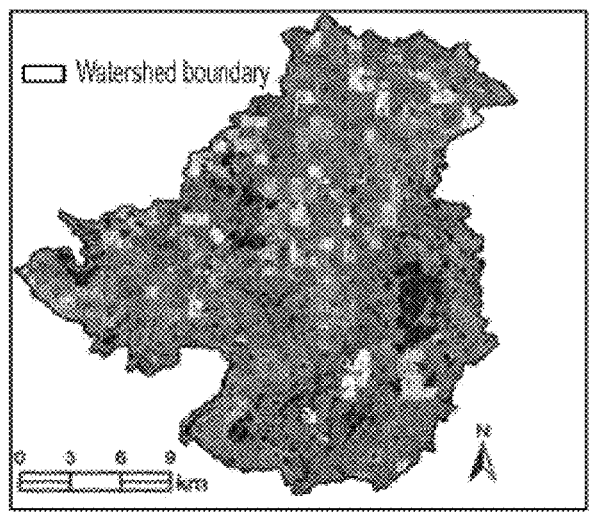
FIG. 22B. national wetlands inventory (NWI) data for the area from 1979-1984.
Figure 22B:
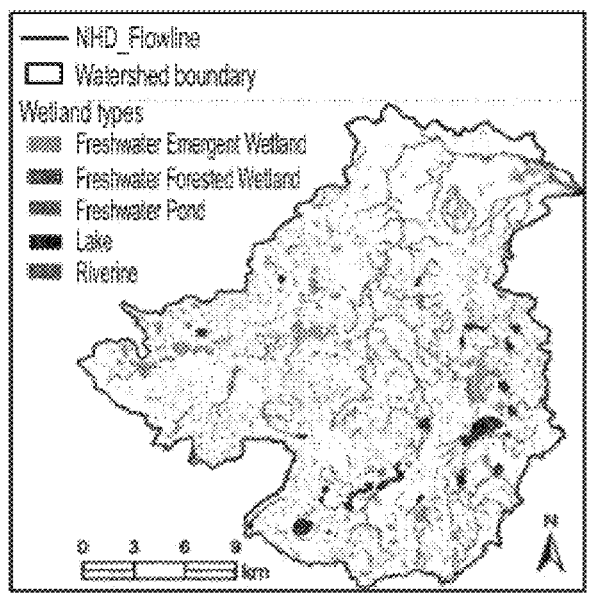

Cloud-free, four-band (red, green, blue, and near-infrared) aerial photographs for the study area were collected from Jul. 14, 2012 to Jul. 30, 2012 by the U.S. Department of Agriculture's National Agriculture Imagery Program (NAIP) during the agricultural growing season. The tiling format of the NAIP imagery is based on a 3.75'×3.75' quarter quadrangle with a 300 pixel buffer on all four sides. The study area was comprised of 29 tiles, which were mosaicked together and clipped to the watershed boundary to create a seamless raster image (FIG. 22A). The color-infrared (CIR) aerial photographs were used for visual assessment of wetland depressions detected from the LiDAR DEM. It should be noted that the aerial photographs were acquired in Summer 2012, when water levels were lower and water surface areas were smaller than those in Fall 2011 when the LiDAR data were acquired, as evidenced by visual comparisons of existing water areas between the LiDAR intensity imagery and aerial photographs.

NWI data (www.fws.gov/wetlands, accessed Dec. 16, 2014) was used for the study area for validation and results comparison. These data were derived by manually interpreting aerial photographs acquired from 1979 to 1984 at a scale of 1:24,000 with subsequent support from soil surveys and field verification. Wetlands were classified based on dominant vegetation structure into various types (see Table 9 set forth in FIG. 23C). National Wetlands Inventory maps have a targeted mapping unit, which is an estimate of the minimum sized wetland that can be reliably mapped; it is not the smallest wetland that appears on the map. The targeted mapping unit for the PPR was 0.1 to 0.4 ha (Tines, 1997 and Johnston, 2013). There were 8,091 NWI polygons across the Little Pipestem Creek watershed, including palustrine, lacustrine, and riverine systems. Freshwater (palustrine) emergent wetland was the dominant wetland type, with 7,804 wetland polygons accounting for 84% of the total wetland area in the study area. Of the 225 freshwater pond polygons, 124 of them were nested within freshwater emergent wetland polygons. Each part of wetland polygons composed of multiple parts were assessed individually, namely each part was considered a unique polygon for purposes of the study. The total area of all NWI polygons was approximately 62 km$^2$, covering 12.3% of the watershed area (506 km$^2$).

It should be noted that the NWI data in this region are considerably out of date, as they were manually interpreted from black and white aerial photographs that were acquired more than 20 years ago. NWI data is a static dataset that does not reflect wetland temporal change, and the positional accuracy associated with the wetland polygons is largely unknown. However, the NWI data does provide a valuable source for wetland location information.

Methods

Figure 24:
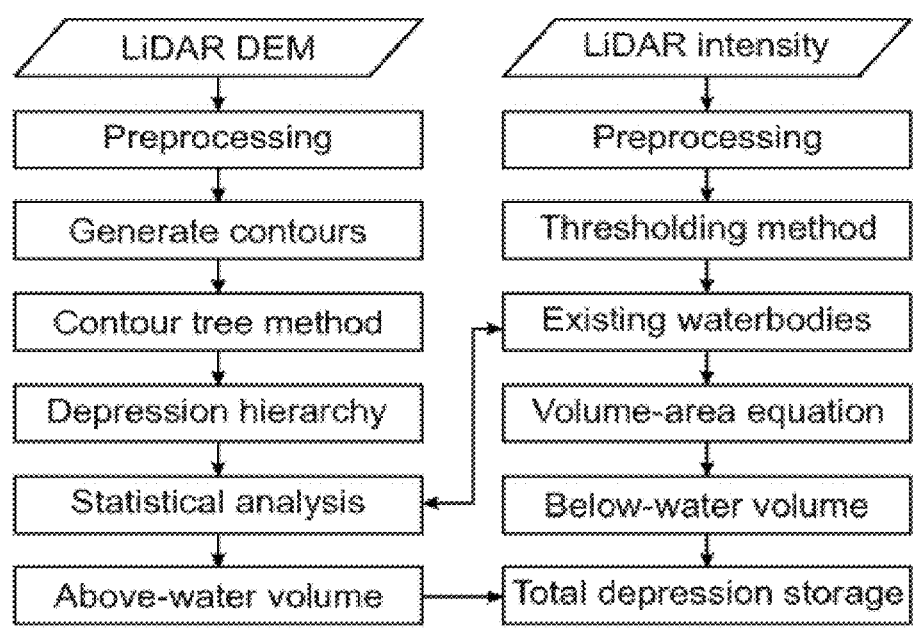
FIG. 24. Flowchart of an embodiment of the inventive methods for delineating potential wetland depressions, quantifying depression hierarchical structure, and estimating depression water storage volumes.

Using the LiDAR-derived bare-earth DEM, potential wetland depressions and their nested hierarchical structure were delineated and quantified using an embodiment of the inventive localized contour tree method. The LiDAR intensity imagery was used to extract existing waterbodies on the ground in late October 2011 when the LiDAR data were acquired. For the depression water storage modeling, two types of depressional storage were considered, the above-water volume and below-water volume. The below-water volume refers to the existing water volume stored in a wetland depression beneath the water surface, whereas the above-water volume is defined as the potential water volume a wetland depression can hold between the water surface and the spilling point. If a depression is completely dry without any existing water, the above-water volume refers to the storage volume between the lowest point in the basin (e.g., sink point) and the spilling point. By adding the computed above-water volume and the estimated below-water volume, the total storage volume was calculated for each individual wetland depression at different hierarchical levels, following the flowchart shown in FIG. 24.

Characterization of Wetland Depressions

Figure 25A:
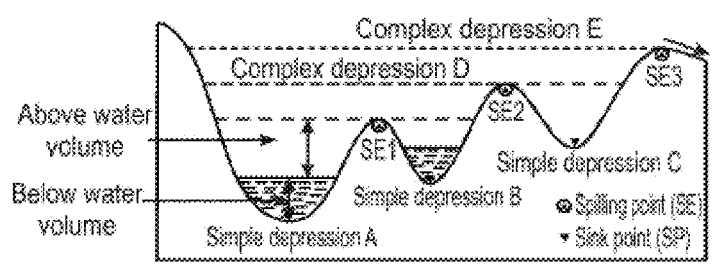
FIG. 25A. Profile view of an illustrative compound/complex depression nested hierarchical structure.
Figure 25B:
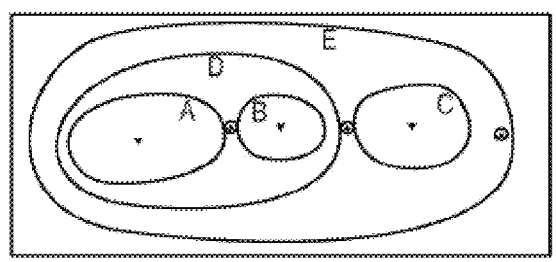
FIG. 25B. A plan view of A.
Figure 25C:
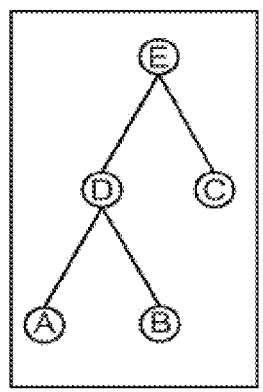
FIG. 25C. A depression tree representation where different color nodes in the tree represent different portions of the complex depression basin of A where blue is $1^{st}$ level, green is $2^{nd}$ level, and red is $3^{rd}$ level.

The nested hierarchical structure of complex topographic depressions controls the dynamic filling, spilling, and merging hydrologic processes, as illustrated in FIGS. 25A, 25B, and 25C. In accordance with embodiments of the invention, topographic depressions were categorized into two groups: simple depressions and complex/compound depressions. A simple depression is a depression that does not have any other depression nested inside, whereas a complex or compound depression has at least two simple depressions nested inside. A large complex/compound depression might also have some smaller complex depressions nested inside. The local minimum at the bottom of a depression is referred to as a sink point (see SP in FIG. 26A), and its elevation is less than or equal to that of its neighbors. As precipitation drains to a depression (or groundwater seeps in), the water surface in it will eventually be raised to a level at which water starts to spill from its perimeter. The lowest point on the depression perimeter is referred to as the spilling point (see SE in FIG. 26A), and the elevation of the spilling point is referred to as the spill elevation (Wang and Liu, 2006). If two or more adjacent simple depressions (i.e., 1st level depressions) share the same spill elevation, they are merged and form a 2nd level complex depression. Similarly, further combinations of 2nd level depressions forms even higher level depressions. Whenever two or more depressions merge, a higher depression level is created. The depression level represents the complexity of the nested hierarchical structure of a depression.

Figure 26A:
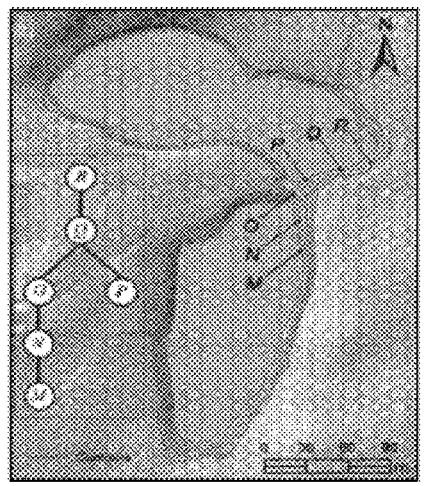
FIG. 26A. Illustration of a localized contour tree method for depression, delineation, the contour level is set at 20 cm, the contour tree representation where the letters on the contour surface correspond to the nodes in the contour tree graph.
Figure 26C:
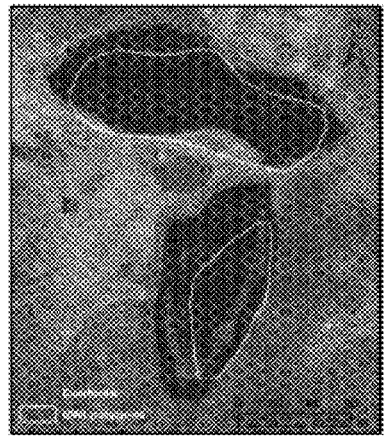
FIG. 26C. Shows closed contours and NWI polygons overlaid on LiDAR intensity imagery from 2011.
Figure 26B:
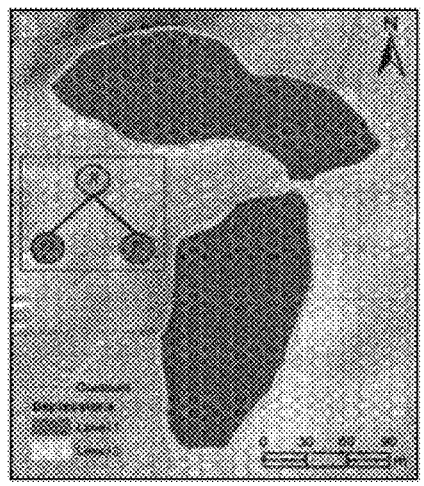
FIG. 26B. A simplified contour tree representation.

As shown in FIGS. 26A, 26B, and 26C, the complex depression D is a 2nd level depression, which has two 1st level simple depressions (A and B) nested inside. Similarly, the complex depression E is a 3rd level depression, in which three 1st level simple depressions (A, B, and C) and one 2nd level complex depression (D) are nested inside. The combination of the topological information about the nested hierarchical structure and the geometric attributes provides a comprehensive description and quantification of each individual surface depression across scales. The nested hierarchical structure of a complex depression can be represented as a depression tree graph (FIG. 26C). The nodes in the tree graph represent depressions, and the link between nodes represents the adjacency and containment relationships between depressions. In the depression contour tree, splitting and merging of nodes represent the change in topology. For example, when overland runoff flows into the simple depressions A and B, their water surfaces would gradually increase. When the water surfaces of simple depression A and simple depression B reach to their spilling point SE1, these two adjacent depressions would merge to form a larger complex depression D, which is reflected by sibling nodes A and B joining at parent node D in the tree graph (FIG. 26C). When the water surface levels of simple depression C and complex depression D increase to above their spilling point SE2, these two depressions further combine to form an even more complex and larger surface depression E, which corresponds to the merge of nodes C and D at root node E. When the water surface level of complex depression E further increases to above the spilling point SE3, the water will spill into downstream basins. The depression tree graph contains information about the nested hierarchical relationships among topographic depressions of different scales.

Figure 27A:
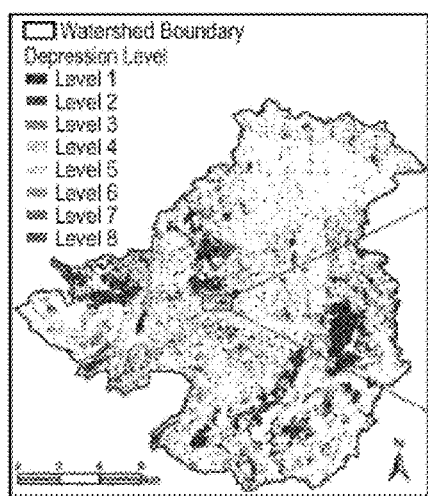
FIG. 27A. Spatial distribution of detected depressions for Little Pipestem Creek watershed.

As previously discussed, in a vector-based contour representation, a topographic depression is indicated by a series of concentric closed contours with the inner contours having lower elevation than their outer surrounding (FIG. 27A). The sink point is located inside the innermost closed contour. The outermost closed contour of the depression indicates the spatial extent (boundary) of the depression. The elevation of the outermost closed contour also approximates the spill elevation for the entire depression. Contours generated from high-resolution LiDAR. DEM s often contain very jagged artifacts. Therefore, the DEM may be smoothed before generating contours. The median or Gaussian smoothing filter may be used to remove data noise and suppress small artifact depressions without distorting the boundaries of true topographic depressions (Liu et al. 2010; Wu et al. 2014). The smoothed DEM is then used to generate contours. There are two key parameters for DEM contouring: the base contour and the contour interval. The base contour may be set as zero while the contour interval is chosen based on the topography of the mapped area and application needs. In the example study, the contour interval was set at 20 cm which was chosen based on the LiDAR vertical accuracy (15 cm) and consideration of computational time. DEM contouring and generation of local contour trees was thereafter performed as previously described in the other examples.

As previously described in Examples 1 and 2, the task of topographic depression detection becomes the identification of spilling contours. To explicitly represent the nested hierarchical structure of a complex depression, the local contour tree is simplified by removing the nodes that do not correspond to spilling contours. The complexity level of a complex depression can be measured by the number of nodes passing through the longest path from the root node to the leaf nodes. Traversing the depression tree top-down simulates the splitting of a large complex depression into smaller lower level depressions when water level decreases, while traversing the depression tree bottom-up emulates the merging of smaller lower level depressions into larger and more complex depressions when water level increases. A complex depression may have more than one first level simple depressions embedded within it, depending on the selection of contour intervals and the elevation difference between the lowest point in the depression and the spill contour elevation. Each depression tree represents one complex depression, and the number of trees in the forest represent the number of complex depressions for the entire area.

After delineating wetland depressions from the LiDAR DEM and quantifying the complexity of their nested hierarchical structure using the localized contour tree method, the presence of standing (antecedent) water in each individual depression was determined to contrast a LiDAR-based assessment with existing area and volume assessments. The following methodology was applied to quantify the maximum volume of water stored in these systems before the spill elevation was reached, applying an area-to-volume algorithm to quantify below-water storage. Wetlands with standing water were characterized with low LiDAR intensity values (i.e., were darker than the surrounding areas), while other land cover types (e.g., cultivated crops, upland grassland) had higher intensity values and were lighter in color. Simple thresholding techniques have been used in previous studies to extract standing waterbodies in LiDAR intensity imagery (Lang and McCarty 2009;

Huang et al. 2011). The 1-m gridded LiDAR intensity imagery for the study area was smoothed using a 3×3 median filter. The filtered intensity image was then used to separate water and non-water pixels. A threshold value was set to separate water and non-water pixels by examining typical waterbodies. The threshold was set at an intensity value of 30 based on examination of the intensity histogram and visual inspection of typical waterbodies in the LiDAR intensity imagery. Areas with intensity values between 0 and 30 were mapped as waterbodies while areas with intensity values between 31 and 255 were mapped as non-water. More detailed description on water pixel classification using LiDAR intensity has been provided by (Huang et al. 2014).

After completion of the identification of potential wetland depressions and delimiting and quantifying depression complexity levels, various geometric attributes of depressions were computed for all depression contour levels, including simple and complex depression surface area, perimeter, maximum depth, mean depth, and depression storage, etc. The above-water volume ($V_{AW}$) for each simple depression that comprises a complex depression (as applicable) was calculated based on statistical analysis of LiDAR DENT cells enclosed by the depression boundary (or spilling) contour:

$$V_{AW} = (Z \times C - S) \times R^2 \qquad \text{[Equation 5]}$$

where Z=elevation of the depression boundary contour; C=number of cells enclosed by the depression boundary contour; S=summation of elevation values of all cells enclosed by the depression contour; and R=pixel resolution of the DEM grid. The maximum depression storage for the entire complex depression area is the summation of depression storage from all simple depressions. $V_{AW}$ was calculated for all depressions that were without any standing water to contrast LiDAR-based volume assessments to area-to-volume equations.

Since the near-infrared LiDAR sensors generally could not penetrate water, the depression morphology beneath the water surface could not be derived from LiDAR data. Therefore, it is not possible to calculate the exact storage volume of an existing waterbody. However, numerous studies have showed that there is a strong statistical relationship between storage volume (V) and surface area (A) in a topographic depression (e.g. Geason et al. 2007; Le and Kumar 2014). Gleason et al. (2007) developed a general area-to-volume equation (Equation 6) relating the volume (V) and wetted area (A) to estimate water storage in pothole wetlands in the Glaciated Plains physiographic region:

$$V = 0.25 \times A^{1.4742} \qquad \text{[Equation 6]}$$

where A is the measured surface area in hectares and V is the predicted storage volume in hectare-meters. Since the study area is located in the Glaciated Plains, Equations 5 and 6 were adopted and modified by transforming the storage volume unit from hectare-meters to cubic meters:

$$V_{BW} = 0.25 \times (A/10{,}000)^{1.4742} \times 10{,}000 \qquad \text{[Equation 7]}$$
$$= 00317 \times A^{1.4742}$$

where A is the water surface area in m² and $V_{BW}$ is the predicted existing below-water storage volume in m³. By adding the LiDAR-computed above-water volumes ($V_{AW}$) and the estimated below-water volumes ($V_{BW}$), the total storage volume ($V_{TW}$) was calculated for each wetland depression (simple depressions or complex depressions) at different levels by:

$$V_{TW} = V_{AW} + V_{BW} \qquad \text{[Equation 8]}$$

Equation 8 combines the maximum potential storage from the lowest point of the contour polygon that is above water (and thus calculated through LiDAR analyses of simple or complex depressions) to the spill elevation plus the calculated volume of water estimated to exist below the wetted area of the wetland depression (as applicable).

Results

Figure 27B:
FIG. 27B. Depression boundaries and NWI polygons overlaid on the LiDAR intensity imagery from 2011.
Figure 27C:
FIG. 27C. Depression boundaries and NWI polygons overlaid on the false color composite of aerial photographs from 2012.

Summarily, after smoothing the 1-m LiDAR-derived bare-earth DEM using a 3×3 median filter, the vector contour representation was generated by setting the base contour of each depression to be zero meters and the contour interval to be 20 cm. The localized contour tree method was then applied to contours to identify topographic depressions in the study area (FIGS. 27A, 27B, and 27C). In total, 12,402 depressions were detected and characterized, of which 11,301 were 1st-level simple depressions, and 1,101 were multi-level (e.g., >1st level) complex depressions. The greatest complexity was found in an eight-level system. For each surface depression (simple depression or complex depressions), geometric and topological properties were computed.

Figure 28:
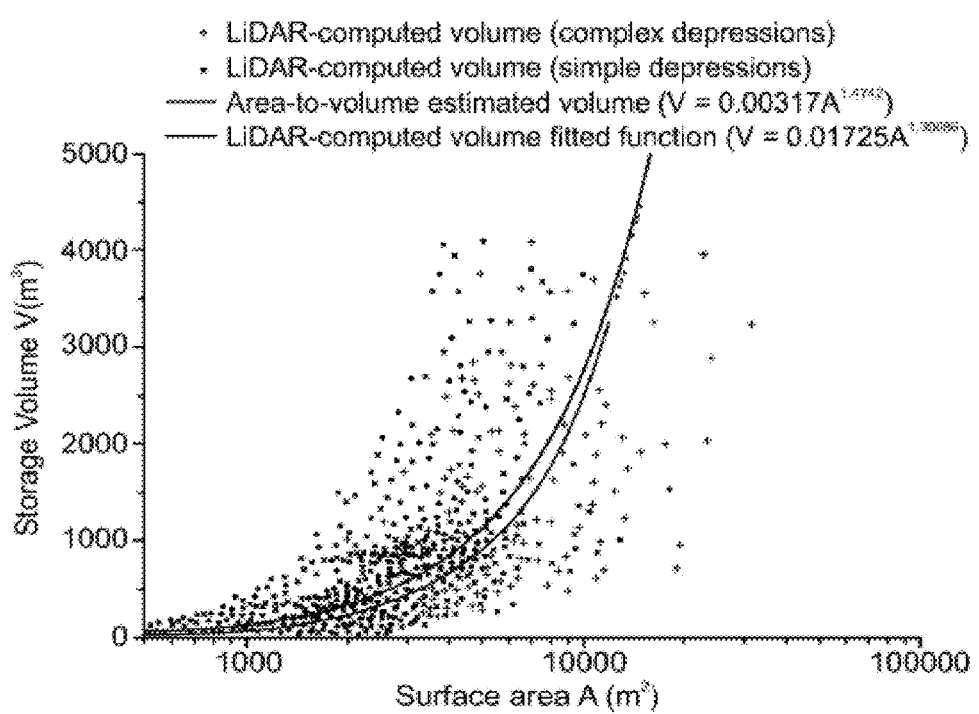
FIG. 28. Graphical comparison of depression area-volume relationships between LiDAR-computed and area-to-volume equation predicted models.

Using the LiDAR intensity data, 3,269 out of 12,402 wetland depressions were identified with standing water. The total water surface area was approximately 5,350 ha, with an average size of 2.04 ha and a median size of 0.182 ha, which is slightly larger than the median size (0.164 ha) of NWI polygons in the study area. Using the $V_{BW}$ equation (Equation 7), it was estimated that these existing waterbodies contained approximately 104.7 million m³ of water. The LiDAR-based storage potential (i.e., Equation 5) was contrasted with the area-to-volume relationship based storage potential equations (i.e., Equation 7) for the remaining 9,133 dry depressions, which were comprised of 8,676 (95.0%) simple depressions and 457 (5%) complex depressions (FIG. 28). Among the dry depressions, 8,643 (88%) were less than 0.20 ha in size. The total surface area of all dry depressions was approximately 1,253 ha. The total LiDAR-computed volume and area-to-volume equation predicted volume were 3.87 and 3.35 million m³, respectively. Overall, the storage volumes using the area-to-volume relationship established in Equation 7 tended to underestimate the LiDAR-computed storage volumes using Equation 5 in the study area, and no distinct pattern was found for measured storage for simple or complex depressions (see FIG. 28). Nevertheless, the area-to-volume equation developed by Gleason et al. (2007) provides a reasonable estimate of full depression storage volume when high-resolution topographic data is not available for precisely calculating the storage volume. Since the area-to-volume equation developed for the Glaciated Plains by Gleason et al. (2007) underestimated the storage volume for wetland depressions in the study area, a new power function curve was fitted to these dry depressions:

$$V = 0.01725 \times A^{1.30086} \qquad \text{[Equation 9]}$$

The fitted power function curve is slightly above the area-to-volume estimated volume, providing a better area-to-volume model for estimating storage volume for wetland depressions in the watershed.

The localized contour tree method is fundamentally different from the previous raster-based methods for topographic depression detection, which used the priority-flood algorithm and its variants to create a hydrologically connected surface by flooding DEMs inwards from their edges (Lindsay and Creed 2006; Wang and Liu 2006; Barnes et al.). The depressions are then derived by subtracting the original DEM from the depression-filled DEM. These raster-based methods assume that the surface is fully flooded and ignore the nested hierarchical structure within depressions. On the contrary, the inventive method for topographic depression detection is a vector-based approach that does not make the fully-flooded assumption. The topographic depression detection problem is treated as the identification of a set of concentric contours with an increasing elevation outward, represented by a contour tree. Localized contour tree construction and search algorithms make the inventive methods computationally efficient and fast. The detection results for topographic depression are likely to be consistent with human interpretation results.

The LiDAR DEM for the study area has a 1-m spatial resolution with a vertical accuracy of 15 CM. It should be able to detect a depression with a diameter of 2 in and a depth of 30 cm according to the Nyquist-Shannon sampling theorem (Blaschke 2010). Since the method is based on the contour representation of depressions, the selection of the base contour line and particularly the contour interval will also affect the depression detection result. The larger the contour interval, the fewer contour lines generated and the less computation time needed to detect depressions (and vice versa). The contour interval chosen to generate contours for the study area was 20 cm. Consequently, the localized contour tree might not detect some shallow depressions whose depths are less than 20 cm, and these depressions might be absent from the contour maps even when these features actually exist in the landscape. This is the intrinsic limitation of DEM contouring, however the number of artifact depressions resulted from LiDAR DEM error may be effectively reduced by setting appropriate thresholds of surface area and depth of depressions.

Figure 26D:
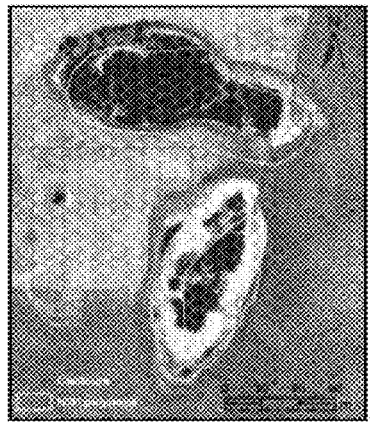
FIG. 26D. Shows closed contours and NWI polygons overlaid on color-infrared aerial photographs from 2012.

The ideal conditions for IDAR data collection are leaf-off and dry antecedent conditions for wetland depression analyses. LiDAR generally cannot penetrate water, meaning that the basin morphology of inundated depressions could not be captured by LiDAR data. Therefore, it is not possible to calculate the exact water volume under the existing water surface. The LiDAR used in our study were collected during late October to early November in 2011, which was after vegetation senescence. However, the depressions appear to be wetter than that in the summer season, as evidenced from water surface comparisons between the LiDAR intensity imagery (2011) and aerial photographs (2012) in FIGS. 26C and 26D, as well as in FIGS. 27B and 27C.

Reliable and up-to-date wetland extent is essential for improving conservation and management of wetlands and flood mitigation efforts. The exemplified embodiment provides a new approach for delineating wetland depressions, quantifying their nested hierarchical structure, and estimating depression water storage volume using LiDAR DEM and LiDAR intensity imagery. Although information presented in this study is specific to the Little Pipestem Creek watershed, the inventive method is applicable to other areas with sufficiently high-resolution topographic data. With the increasing availability and high-resolution LiDAR data and aerial photographs, such as in the PPR, the inventive methods provide a reliable way for monitoring and updating wetland extent and estimating water storage capability.

What is claimed:

1. A computer-implemented method for detecting and characterizing surface depressions in a topographical area, the method comprising:

a) providing a digital elevation model (DEM) of the topographical area, wherein the DEM is derived from high resolution digital elevation data collected by Light Detecting and Ranging (LiDAR) or Interferometric Synthetic Aperture Radar (InSAR) technology;

b) designating a base elevation contour and a contour interval for the DEM;

c) using the base elevation contour and interval from b), generating an elevation contour representation of the topographical area, wherein the contour representation comprises closed contour lines and excludes open contour lines;

d) identifying one or more seed contours, defined as a lowest elevation interior contour in a set of concentric closed contours, and, beginning with the lowest elevation seed contour and hierarchically expanding to higher elevation contours until a highest elevation contour is reached, constructing a local contour tree, wherein each contour line is represented as a node in the local contour tree;

e) repeating step (d) iteratively until all highest elevation contours are incorporated in a local contour tree; wherein the number of surface depressions corresponds to the number of local contour trees, a simple depression comprises a local contour tree with one seed node, and a complex depression comprises a local contour tree with more than one seed node;

f) identifying a quasi-pour contour node for each local contour tree; and g) determining a true-pour contour node for each local contour tree, wherein an elevation of a true pour contour node is a spill elevation and an elevation of a quasi-pour contour node is less than or equal to the elevation of the true pour contour node.

2. The method according to claim 1, wherein prior to step (b), the DEM is subjected to pre-processing to extract a subset of the DEM comprising surface depressions, said preprocessing comprising applying a smoothing operation, applying a filling operation, generating an elevation difference DEM, and converting the elevation difference DEM raster to generate a polygon layer, using the polygon layer as a mask to extract the subset of the DEM.

3. The method according to claim 1, wherein the determining of step (g) comprises expanding an elevation of each quasi-pour contour outward by an incremental buffering algorithm to determine elevation of the true pour contour.

4. The method according to claim 1, wherein a contour interval is selected to increase or decrease density of the closed contour lines.

5. The method according to claim 1, wherein construction of local contour trees is prioritized based on elevation of the identified seed contours such that the local contour tree comprising the lowest seed contour line elevation is constructed first.

6. The method according to claim 1, wherein a local contour tree comprises one root node corresponding to a highest elevation contour, a set$\geq 0$ of internal nodes, and a set$\geq 1$ of terminal nodes, each terminal node corresponding to a seed contour enclosed within the highest elevation contour, each internal node having 0 or 1 parent nodes, and 1 or more child nodes, wherein an internal node having 2 or more child nodes is designated a fork node, and each child of a fork node is designated a split node.

7. The method according to claim 1, further comprising calculating one or more morphometric properties of the detected depressions.

8. The method according to claim 7, wherein the morphometric properties are selected from one or more planimetric properties, volumetric properties, and shape properties.

9. The method according to claim 8, wherein the planimetric properties are derived from the true-pour contour and are selected from a geographical location of a centroid point, perimeter, surface area.

10. The method according to claim 8, wherein the volumetric properties are selected from mean depth of a depression, maximum depth of a depression, standard deviation of elevation (STD) and water detention capacity of a depression.

11. The method according to claim 10, wherein the shape properties are selected from compact index (CI), circularity (ELG) and asymmetry.

12. The method according to claim 6, further comprising generating simplified local contour trees by removing all internal nodes that are not forked nodes such that all remaining internal nodes correspond to pour contours of non-surface depressions.

13. The method according to claim 2, wherein the topographical area comprises a Karst landscape and the surface depressions sought to be detected and characterized comprise sinkholes, the method further comprising (h) calculating one or more morphometric property values of detected depressions and comparing the value to a threshold value for each morphometric property to eliminate surface depressions not likely to be sinkholes, wherein the threshold values are based on morphological data derived from sinkholes previously identified and characterized in the Karst landscape.

14. The method according to claim 2, wherein the topographical area comprises a Wetlands landscape and the surface depressions sought to be detected and characterized comprise wetlands potholes, the method further comprising (h) calculating one or more morphometric property values of detected depressions and comparing the value to a threshold value for each morphometric property to eliminate surface depressions not likely to be potholes, wherein the threshold values are based on morphological data derived from potholes previously identified and characterized in the Wetlands landscape.

15. A method of constructing a hydrological model of a wetlands landscape comprising potholes, the method comprising accounting for intra-depression elevation morphology of complex potholes within the landscape by detecting and characterizing the potholes according to the method of claim 14, wherein the method is performed at least twice across a time frame, further wherein characterizing comprises quantifying water storage, the method further comprising quantifying a change in water storage across the time frame.

16. A non-transitory computer readable medium comprising computer-executable instructions for carrying out the method according to claim 1.

17. A non-transitory computer readable medium comprising computer-executable instructions for carrying out the method according to claim 13.

18. A non-transitory computer readable medium comprising computer-executable instructions for carrying out the method according to claim 16.

* * * * *